(12) United States Patent
Hong et al.

(10) Patent No.: US 12,146,126 B2
(45) Date of Patent: Nov. 19, 2024

(54) BEVERAGE MAKER WITH TANK WITH COOLING AND HEATING

(71) Applicant: LG Electronics Inc., Seoul (KR)

(72) Inventors: Jinpyo Hong, Seoul (KR); Kwangyong An, Seoul (KR); Yongbum Kim, Seoul (KR); Suchang Cho, Seoul (KR); Youngjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 784 days.

(21) Appl. No.: 17/327,338

(22) Filed: May 21, 2021

(65) Prior Publication Data
US 2021/0388296 A1 Dec. 16, 2021

(30) Foreign Application Priority Data
Jun. 10, 2020 (KR) .......................... 10-2020-0070086

(51) Int. Cl.
*C12C 11/00* (2006.01)
*C12C 13/10* (2006.01)

(52) U.S. Cl.
CPC ............ *C12C 11/006* (2013.01); *C12C 13/10* (2013.01)

(58) Field of Classification Search
None
See application file for complete search history.

(56) References Cited

U.S. PATENT DOCUMENTS

| 7,963,213 B1* | 6/2011 | Murdock | C12C 13/10 99/323.1 |
| 2002/0134545 A1* | 9/2002 | Cho | A23B 7/148 165/289 |
| 2020/0102527 A1* | 4/2020 | Hong | B67D 1/1245 |

FOREIGN PATENT DOCUMENTS

| JP | 2014211221 | 11/2014 |
| KR | 20190081873 | 7/2019 |
| KR | 20190081888 | 7/2019 |

OTHER PUBLICATIONS

KR 2019-0081888 A (Kim, Yongbun et al.) Jul. 9, 2019 [retrieved on Feb. 29, 2024]. Retrieved from Foreign Image and Text database, translation by Clarivate Analytics. (Year: 2019).*
Office Action in Korean Appln. No. 10-2020-0070086, dated Nov. 17, 2021, 17 pages (with English translation).

* cited by examiner

*Primary Examiner* — John J Norton
(74) *Attorney, Agent, or Firm* — Fish & Richardson P.C.

(57) ABSTRACT

A beverage maker includes a fermentation tank in which an internal space for fermentation is formed, a temperature controller configured to control a temperature of the fermentation tank and including an evaporator and a heater, and an insulation portion surrounding a portion of an outer circumferential surface of the fermentation tank. The fermentation tank may include a first chamber, in which the evaporator is disposed, and a second chamber configured to be in contact with the heater and coupled to the first chamber, and the insulation portion may be located between the first chamber and the evaporator.

15 Claims, 8 Drawing Sheets

BEVERAGE MAKER WITH TANK WITH COOLING AND HEATING

CROSS-REFERENCE TO RELATED APPLICATIONS

The present application claims priority under 35 U.S.C. 119 and 35 U.S.C. 365 to Korean Patent Application No. 10-2020-0070086, filed on Jun. 10, 2020, which is hereby incorporated by reference in its entirety.

BACKGROUND

The present disclosure relates to a beverage maker and, more particularly, to a beverage maker for making fermented beverages.

Beverages are collectively referred to as drinkable liquids such as alcohol or tea. For example, beverages may be divided into various categories such as water (a beverage) to solve thirst, juice beverages with unique flavor and taste, refreshing beverages giving refreshing sensation, or alcoholic beverages with an alcohol effect.

A representative example of an alcoholic beverage may be a beer. The beer is an alcoholic beverage made by making juice of malt sprouting from barley, filtering the juice, adding hop, and fermenting the juice by using the yeast.

Consumers may purchase ready-made products made and sold by a beer maker or home beer (or handmade beer) made by directly fermenting beer ingredients at home or in a bar.

In recent years, a beverage maker capable of easily making house beer at home or a bar is gradually being used, and it is preferable that such a beverage maker safely and conveniently makes beer.

As related art, Korean Patent Laid-Open Publication No. 10-2018-0134629 discloses a beverage maker including a fermentation tank assembly provided with a refrigeration cycle device having a compressor, a condenser, an expansion mechanism, and an evaporator.

In the fermentation tank assembly for fermentation, the internal temperature of the fermentation tank is controlled through the evaporator and a heater. In this case, when too cold refrigerant temporarily passes through the evaporator, shock may partially occur in yeast.

That is, the yeast adjacent to the evaporator may have dull movement or die due to the temperature of the evaporator.

SUMMARY

An object of the present disclosure devised to solve the problem lies in a beverage maker for preventing shock from occurring in yeast due to the temperature of an evaporator.

Another object of the present disclosure devised to solve the problem lies in a beverage maker for making beverages in a faster time through stable activity of yeast.

A beverage maker according to an embodiment of the present disclosure can shorten a fermentation time by allowing a uniform temperature to be distributed throughout a fermentation tank, and prevent activity of yeast from decreasing due to a local temperature change.

To this end, the beverage maker may include a separate insulation portion between an evaporator and a fermentation tank.

Specifically, the beverage maker may include a fermentation tank in which an internal space for fermentation is formed, a temperature controller configured to control a temperature of the fermentation tank and including an evaporator and a heater, and an insulation portion surrounding a portion of an outer circumferential surface of the fermentation tank.

The fermentation tank may include a first chamber, in which the evaporator is disposed, and a second chamber configured to be in contact with the heater and coupled to the first chamber, and the insulation portion may be located between the first chamber and the evaporator.

The insulation portion may include a plate spaced apart from the outer circumferential surface of the fermentation tank by a predetermined gap to define an air layer along with the outer circumferential surface of the fermentation tank.

The plate may include both ends bent and extended toward the outer circumferential surface of the fermentation tank, and the outer circumferential surface of the fermentation tank and the both ends may be in contact with each other.

The second chamber may be coupled to a lower end of the first chamber, and the heater may be disposed on a lower end of the second chamber.

The insulation portion may include an insulation member disposed along an outer circumferential surface of the first chamber.

The insulation portion may further include a heat conduction sheet surrounding the insulation member and the fermentation tank outside the insulation member.

The heat conduction sheet may be a graphite sheet, and the heat conduction sheet may surround outer circumferential surfaces of the first chamber and the second chamber.

A thickness of the insulation member in an outward direction of the fermentation tank may be greater than that of the heat conduction sheet in the outward direction of the fermentation tank.

The heat conduction sheet and the heater may be spaced apart from each other.

The beverage maker may further include a coupling portion in which a lower end of the first chamber and an upper end of the second chamber are in contact with each other, and the heat conduction sheet may surround the coupling portion.

A lower end of the first chamber may be bent and extended outward, and the insulation member may be in contact with the lower end of the first chamber.

A length of the heat conduction sheet in an upper-and-lower direction may be greater than that of the insulation member in the upper-and-lower direction.

The evaporator may include an evaporation tube defining a refrigerant flow path, through which refrigerant flows, and the evaporation tube may be spirally wound on an outer surface of the fermentation tank.

The beverage maker may further include a fermentation case surrounding an outside of the fermentation tank with a predetermined gap, an insulation may be accommodated between the fermentation case and the fermentation tank.

According to the embodiments of the present disclosure, since an evaporator is in direct contact with a fermentation tank, it is possible to minimize a temperature variation between a portion, with which the evaporator is in contact, and a portion, with which the evaporator is not in contact, during cooling.

In addition, it is possible to prevent mobility of yeast by shock due to an extremely low temperature of a portion, with which the evaporator is in direct contact, to uniformly maintain the temperature of the entire fermentation tank, and to shorten a fermentation time and a beverage making time.

In addition, it is possible to reduce a fermentation variation due to a temperature variation, by preventing activity of yeast from decreasing due to a temperature variation of content in the fermentation tank.

DETAILED DESCRIPTION OF THE EMBODIMENTS

Hereinafter, detailed embodiments of the present disclosure will be described in detail with reference to the accompanying drawings.

Although beer is exemplified as a beverage made by using a beverage maker in this specification, a kind of beverages is not limited to the beer that is capable of being made by using the beverage maker. For example, various kinds of beverages may be made through the beverage maker according to embodiments.

Figure 1:
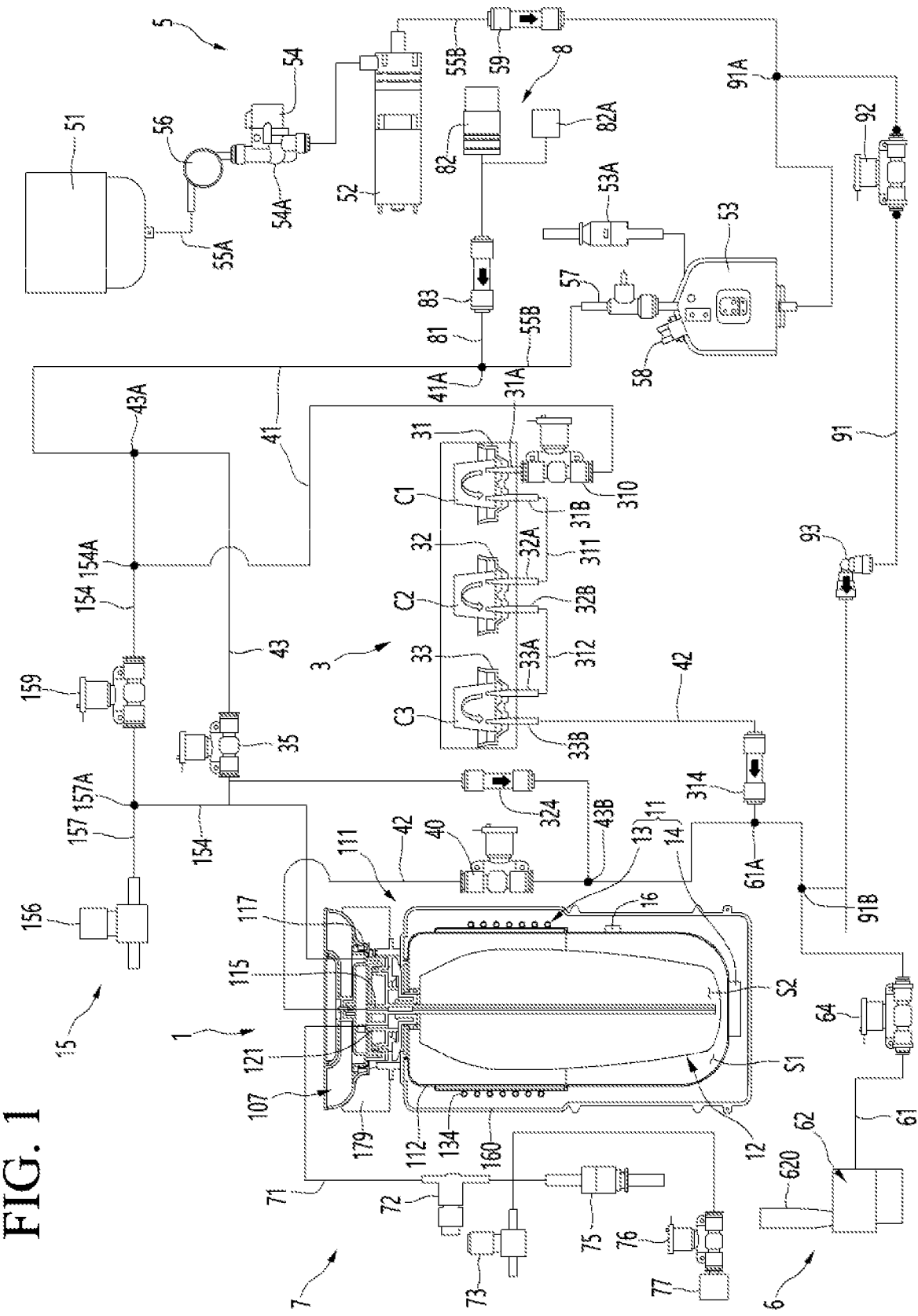
FIG. 1 is a diagram illustrating the configuration of a beverage maker according to an embodiment of the present disclosure.

FIG. 1 is a perspective view of a beverage maker according to an embodiment.

A beverage maker may include a fermentation module 1. A beverage may be fermented in the fermentation module 1.

The beverage maker may include a temperature controller that controls an inner temperature of the fermentation module 1.

The beverage maker may include a water supply module 5. The water supply module 5 may supply water.

The beverage maker may include ingredient supplier 3 provided with ingredient accommodating portion 31, 32, and 33 in which ingredients required for making the beverage are accommodated.

The beverage maker may include main channel 41 and 42 connecting the water supply module 5 to the fermentation module 1.

The beverage maker may include a beverage dispenser 6 for dispensing the beverage made in the fermentation module 1 to the outside.

The beverage dispenser 6 may be connected to a second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector for injecting air. The air injector 8 may be connected to the water supply module 5 or a first main channel 41. The air injector may include an air pump 82.

The beverage maker may further include an air controller 15 controlling a pressure between an inner wall of a fermentation tank 112 and an outer surface of a fermentation container 12.

The beverage maker may further include a sub channel 91. The sub channel 91 may connect the water supply module 5 to the beverage dispenser 6.

Hereinafter, the fermentation module 1 will be described in detail.

The fermentation module 1 may include a fermentation tank 112 having a space S1 and a fermentation lid 107 opening and closing the space S1.

The fermentation tank 112 may include a fermentation case 160 and an fermentation tank 112 accommodated in the fermentation case 160 and having the inner space S1. An insulation portion 104 may be provided between the fermentation case 160 and the fermentation tank 112. The fermentation tank 112 may further include a lid connector 105 on which the fermentation lid 107 is seated.

Each of the fermentation case 160 and the fermentation tank 112 may be provided as an assembly of a plurality of members. The fermentation case 160 may define an outer appearance of the fermentation tank 112.

The fermentation lid 107 may seal the inside of the fermentation tank 112 and be disposed on the fermentation tank 112 to cover the opening S1. A main channel, particularly, a main channel connecting portion 115 connected to a second main channel 42 may be provided in the fermentation lid 107.

A fermentation container 12 may be accommodated in the fermentation tank 112.

The fermentation container 12 may be provided as a separate container so that the beverage ingredients and the made beverage stain an inner wall of the fermentation tank 112. The fermentation container 12 may be separably disposed on the fermentation tank 112. The fermentation container 12 may be seated on the fermentation tank 112 to ferment the beverage within the fermentation tank 112. After the fermentation container 12 is used, the fermentation container 12 may be withdrawn to the outside of the fermentation tank 112.

The fermentation container 12 may be a pack containing the ingredients for making the beverage. The fermentation container 12 may be made of a flexible material. Thus, the fermentation container 12 may be easily inserted into the fermentation tank 112 and be contracted and expanded by a pressure. However, this embodiment is not limited thereto. For example, the fermentation container 12 may be made of a pet material.

The fermentation container 12 may have a beverage making space S2 in which the beverage ingredients are accommodated, and the beverage is made. The fermentation container 12 may have a size less than that of the inner space S1 of the fermentation tank 112.

The fermentation container 12 may be inserted and accommodated into the fermentation tank 112 in the state in which the ingredients are contained in the fermentation container 12. The fermentation container 12 may be inserted into the fermentation tank 112 and then accommodated in the fermentation tank 112 in the state in which the fermentation lid 107 is opened.

The fermentation lid 107 may seal the fermentation tank 112 after the fermentation container 12 is inserted into the fermentation tank 112. The fermentation container 12 may assist the fermentation of the ingredient in the state in which the fermentation container 12 is accommodated in the space S1 that is sealed by the fermentation tank 112 and the fermentation lid 107. The fermentation container 12 may be expanded by the pressure therein during the making of the beverage. The fermentation container 12 may be pressed by the air within the fermentation tank 112 when the beverage contained in the fermentation container 12 is dispensed, and the air is supplied between an inner surface of the fermentation tank 112 and the fermentation container 12.

The fermentation tank 112 may be disposed in the fermentation case 160. The fermentation tank 112 may have an outer circumference surface and a bottom surface, which are spaced apart from the inner surface of the fermentation case 160. In more detail, the outer circumference the fermentation tank 112 may be spaced apart from an inner circumference of the fermentation case 160, and an outer bottom surface of the fermentation tank 112 may be spaced apart from an inner bottom surface of the fermentation case 160.

The insulation portion (not shown) may be provided between the fermentation case 160 and the fermentation tank 112. The insulation portion may be disposed in the fermentation case 160 to surround the fermentation tank 112. Thus, the fermentation tank 112 may be constantly maintained in temperature.

The insulation portion may be made of a material such as foamed polystyrene or polyurethane which has high thermal insulating performance and absorbs vibration.

The fermentation tank 112 may include a temperature sensor 16 for measuring the temperature of the fermentation tank 112.

The temperature sensor 16 may be mounted on a circumferential surface of the fermentation tank 112. The temperature sensor 16 may be disposed below an evaporator 15 wound around the fermentation tank 112.

Hereinafter, the temperature controller 11 will be described in detail.

The temperature controller 11 may change an inner temperature of the fermentation tank 112. In more detail, the temperature controller 11 may change a temperature of the fermentation tank 112.

The temperature controller 11 may heat or cool the fermentation tank 102 to control a temperature of the fermentation tank 102 at an optimal temperature for fermenting the beverage.

The temperature controller 11 may include at least one of a refrigerant cycle device 13 and a heater 14. However, this embodiment is not limited thereto. For example, the temperature controller 11 may include a thermoelement TEM.

The refrigerant cycle device 13 may control the fermentation tank 112 to adjust a temperature of the fermentation tank 112. The refrigerant cycle device 13 may include a compressor, a condenser, an expansion mechanism, and an evaporator 15.

The evaporator 15 may be disposed to contact an outer surface of the fermentation tank 102. The evaporator 15 may be provided as an evaporation tube wound around an outer surface of the fermentation tank 112. The evaporator 15 may be accommodated between the fermentation tank 112 and the insulation portion to cool the fermentation tank 112 that is insulated by the insulation portion.

The temperature controller 11 may further include a heater 14 heating the fermentation tank 112. The heater 14 may be installed to contact the bottom surface of the fermentation tank 112. The heater 14 may be provided as a heat generation heater that generates heat when power is applied. The heater 14 may be provided as a plate heater.

Thus, the natural convection of a fluid may be generated inside the fermentation tank 112 by the evaporator 15 and the heater 14, and temperature distribution inside the fermentation tank 112 and the fermentation container 12 may be uniform.

Hereinafter, the main channel 41 and 42 and a bypass channel 43 will be described.

As described above, the main channel 41 and 42 may include a first main channel 41 connecting the water supply module 5 to the ingredient supplier 3 and a second main channel 42 connecting the ingredient supplier 3 to the fermentation module 1.

That is, the first main channel 41 may guide water supplied from the water supply module 5 to the ingredient supplier 3, and the second main channel 42 may guide the mixture of the ingredients and the water, which are extracted from the ingredient supplier 3, to the fermentation module 1.

The first main channel 41 may have one end 41A connected to the water supply module 5 and the other end connected to the ingredient supplier 3, more particularly, an inlet of an initial ingredient accommodating portion 31, which will be described below in more detail.

An ingredient supply valve 310 opening and closing the first main channel 41 may be installed in the first main channel 41. The ingredient supply valve 310 may be provided in the ingredient supplier 3.

The ingredient supply valve 310 may be opened when additives accommodated in the ingredient accommodating portions 31, 32, and 33 are put to open the first main channel 41. The ingredient supply valve 310 may be opened when the ingredient accommodating portions 31, 32, and 33 are cleaned to open the first main channel 41.

The second main channel 42 may have one end connected to a main channel connecting portion 115 of the fermentation module 1 and the other end connected to the ingredient supplier 3, more particularly, an outlet 33B of a final ingredient accommodating portion 33, which will be described below in more detail.

A main valve 40 opening and closing the second main channel 42 may be installed in the second main channel 42. Also, a main check valve 314 for allowing the fluid to flow from the ingredient supplier 3 to the fermentation module 1 may be installed in the second main channel 42. That is, the main check valve 314 may prevent the fluid from flowing back to the ingredient supplier 3.

The main check valve 314 may be disposed between the main valve 40 and the ingredient supplier 3 with respect to the second main channel 42.

The main valve 40 may be opened when the water is supplied to the fermentation container 12 to open the second main channel 42. The main valve 40 may be closed while the fermentation tank 112 is cooled to close the second main channel 42. The main valve 40 may be opened when the air is injected into the fermentation container 12 to open the second main channel 42. The main valve 40 may be opened when the additives are supplied into the fermentation container 1 to open the second main channel 42. The main valve 40 may be closed to seal the inside of the fermentation container 12 during the fermentation of the ingredients. The main valve 40 may be closed to seal the inside of the fermentation container 12 when the beverage is aged and stored. The main valve 40 may be opened when the beverage is dispensed by the beverage dispenser 6 to open the second main channel 4. The beverage within the fermentation container 1 may pass through the main valve 40 to flow to the beverage dispenser 6.

The main channel 41 and 42 may be provided as one continuous channel when the beverage maker does not include the ingredient supplier 3.

When the beverage maker includes the ingredient supplier 3, the beverage maker may further include a bypass channel 43 configured to allow the water or the air to bypass the ingredient accommodating portions 31 and 32.

The bypass channel 43 may bypass the ingredient accommodating portions 31, 32, and 33 and then be connected to the first main channel 41 and the second main channel 42.

The bypass channel 43 may have one end connected to the first main channel 41 and the other end connected to the second main channel 42. In more detail, the bypass channel 43 may have one end 43A connected to the first main channel 41 between the water supply module 5 and the ingredient supply valve 310 and the other end 43B connected to the second main channel 42 between the main valve 40 and the ingredient supplier 3.

A bypass valve 35 opening and closing the bypass channel 43 may be installed in the bypass channel 43.

The bypass valve 35 may be opened when the water supplied from the water supply module 5 is supplied to the fermentation container 12 to open the bypass channel 43. The bypass valve 35 may be opened when the air injected from the air injector 8 is supplied to the fermentation container 12 to open the bypass channel 43. The bypass valve 35 may be opened when the bypass channel 43 is cleaned to open the bypass channel 43.

Also, a bypass check valve 324 allowing the fluid to flow from the first main channel 41 to the second main channel 42 may be installed in the bypass channel 43. That is, the fluid may flow only from the first main channel 41 to the second main channel 42 but may not flow in the opposite direction.

The bypass check valve 324 may be disposed between the bypass valve 35 and the second main channel 42 with respect to the bypass channel 43.

Hereinafter, the ingredient supplier 3 will be described in detail.

When beer is made by using the beverage maker, the ingredients for making the beer may include water, malt, yeast, hop, flavouring additives, and the like.

The beverage maker may include all of the ingredient supplier 3 and the fermentation container 12. The ingredients for making the beverage may be accommodated to be divided into the ingredient supplier and fermentation container 12. A portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the water supplied from the water supply module 5 and mixed with the portion of the ingredients accommodated in the fermentation container 12.

A main ingredient that is essential for making the beverage may be accommodated in the fermentation container 12, and the additives added to the main ingredient may be accommodated in the ingredient supplier 3. In this case, the additives accommodated in the ingredient supplier 3 may be mixed with the water supplied from the water supply module 5 and supplied to the fermentation container 12 and then be mixed with the main ingredient accommodated in the fermentation container 12.

The main ingredient accommodated in the fermentation container 12 may have a capacity greater than that of other ingredients. For example, when the beer is made, the main material may be the malt of the malt, the yeast, the hop, and the flavouring additives. Also, the additive accommodated in the ingredient supplier 3 may be the other ingredient except for the malt of the ingredient for making the beer, for example, the yeast, the hop, and the flavouring additives.

The beverage maker may not include the ingredient supplier 3 but include the fermentation container 12. In this case, the main ingredient may be accommodated in the fermentation container 12, and the user may directly put the additives into the fermentation container 12.

If the beverage maker includes all the ingredient supplier 3 and the fermentation container 12, the beverage may be more easily made. Hereinafter, the case in which the beverage maker includes all of the ingredient supplier 3 and the fermentation container, will be described as an example. However, this embodiment is not limited to the case in which the beverage maker includes all of the ingredient supplier 3 and the fermentation container 12.

The ingredients within the fermentation container 12 may be fermented as time elapses, and the beverage made in the fermentation container 12 may flow to the second main channel 42 through the main channel connecting portion 115 and also flow from the second main channel 42 to the beverage dispenser 6 so as to be dispensed.

The ingredients that are necessary for making the beverage may be accommodated in the ingredient supplier 3, and the water supplied from the water supply module 5 may pass through ingredient supplier 3. For example, when the beverage made in the beverage maker is beer, the ingredient accommodated in the ingredient supplier 3 may be yeast, hop, flavouring additives, and the like.

The ingredient accommodated in the ingredient supplier 3 may be directly accommodated into an ingredient accommodating portions 31, 32, and 33 provided in the ingredient supplier 3. At least one ingredient accommodating portion 31, 32, and 33 may be provided in the ingredient supplier 3. The plurality of ingredient accommodating portions 31, 32, and 33 may be provided in the ingredient supplier. In this case, the ingredient accommodating portions 31, 32, and 33 may be partitioned with respect to each other.

Inlets 31A, 32A, and 33A through which the fluid is introduced and outlets 31B, 32B, and 33B through which the fluid is discharged may be provided in the ingredient accommodating portions 31, 32, and 33, respectively. The fluid introduced into the inlet of one ingredient accommodating portion may be mixed with the ingredients within the ingredient accommodating portions and then discharged through the outlet.

The ingredients accommodated in the ingredient supplier 3 may be accommodated in capsule C1, C2, and C3. In this case, the capsule C1, C2, and C3 may be accommodated in the ingredient accommodating portion 31, 32, and 33, and the ingredient accommodating portion 31, 32, and 33 may be called a capsule mounting portion.

When the ingredients are accommodated in the capsules C1, C2, and C3, the ingredient supplier 3 may be configured so that the capsules C1, C2, and C3 are seated and withdrawn. The ingredient supplier may be provided as a capsule kit assembly in which the capsules C1, C2, and C3 are separably accommodated.

For example, a first additive, a second additive, and a third additive may be accommodated in the ingredient supplier 3.

The first additive may be yeast, the second additive may be hop, and the third additive may be a flavouring additive.

The ingredient supplier 3 may include a first capsule mounting portion 31 in which a first capsule C1 containing the first additive is accommodated, a second capsule mounting portion 32 in which a second capsule C2 containing the second additive is accommodated, and a third capsule mounting portion 33 in which a third capsule C3 containing the third additive is accommodated.

The ingredients contained in the ingredient accommodating portion or the capsules C1, C2, and C3 may be extracted by a water pressure of the water supplied from the water supply module 5.

When the ingredients are extracted by the water pressure, the water supplied from the water supply module 5 to the first main channel 41 may pass through the ingredient accommodating portion or the capsules C1, C2, and C3 and then be mixed with the ingredients, and the ingredients accommodated in the ingredient accommodating portion or the capsules C1, C2, and C3 may flow to the second main channel together with the water.

A plurality of additives different from each other may be accommodated to be divided in the ingredient supplier 3. For example, when the beer is made, the plurality of additives accommodated in the ingredient supplier 3 may be the yeast, the hop, and the flavouring additive, which are accommodated to be divided from each other.

When the plurality of ingredient accommodating portions are provided in the ingredient supplier 3, the plurality of ingredient accommodating portions 31, 32, and 33 may be connected in series to each other in a flow direction of the water.

In more detail, the ingredient supplier 3 may include at least one connecting channel 311 and 312 connecting the outlet of one ingredient accommodating portion of the plurality of ingredient accommodating portions 31, 32, and 33 to the inlet of the other ingredient accommodating portion.

Also, the plurality of ingredient accommodating portions 31, 32, and 33 may include an initial ingredient accommodating portion 31 and a final ingredient accommodating portion 33. The plurality of ingredient accommodating portions 31, 32, and 333 may further include an intermediate ingredient accommodating portion 32.

The inlet 31A of the initial ingredient accommodating portion 31 may be connected to the first main channel 41, and the outlet 33B of the final ingredient accommodating portion 33 may be connected to the second main channel 42.

The intermediate ingredient accommodating portion 32 may be disposed between the first ingredient accommodating portion 31 and the second ingredient accommodating portion 33 in the flow direction of the fluid. The inlet 32A and the outlet 32B of the intermediate ingredient accommodating portion 32 may be connected to the connecting channels 311 and 312 different from each other.

Figure 2:
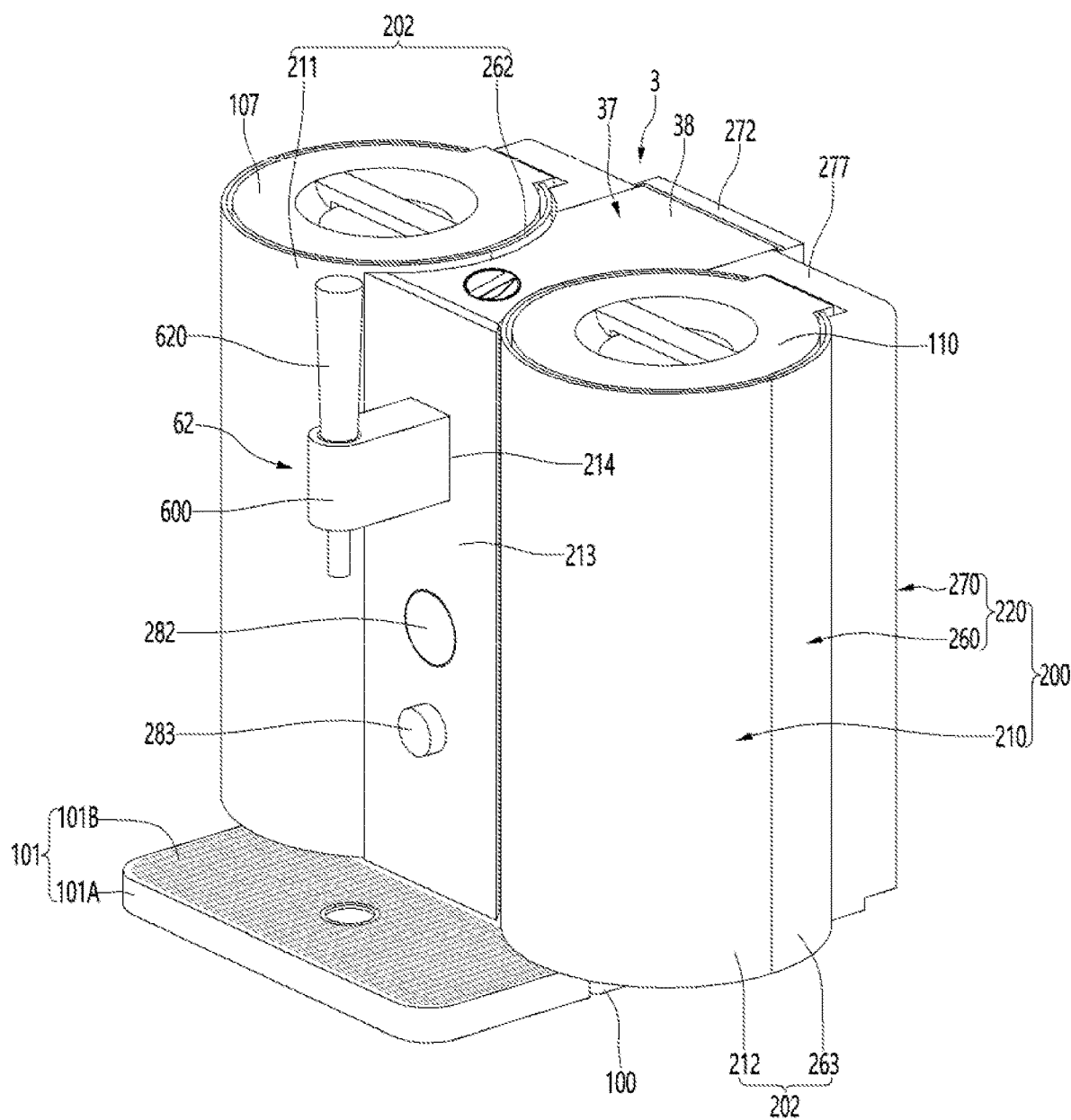
FIG. 2 is a perspective view of a beverage maker according to an embodiment of the present disclosure.

As illustrated in FIG. 2, when three ingredient accommodating portions are provided in the ingredient supplier 3, the outlet 31B of the final ingredient accommodating portion 31 may be connected to the inlet 32A of the intermediate ingredient accommodating portion 32 through the first connecting channel 311, and the outlet 32B of the intermediate ingredient accommodating portion 32 may be connected to the inlet 33A of the final ingredient accommodating portion 33 through the second connecting channel 312.

In this case, the water introduced into the inlet 31A of the final ingredient accommodating portion 31 through the first main channel 41 may flow to the first connecting channel 311 through the outlet 31B together with the first additive accommodated in the initial ingredient accommodating portion 31.

The fluid (the mixture of the water and the first additive) introduced into the inlet 32A of the intermediate ingredient accommodating portion 32 through the first main channel 311 may flow to the second connecting channel 312 through the outlet 32B together with the second additive accommodated in the intermediate ingredient accommodating portion 32.

The fluid (the mixture of the water and the first and second additives) introduced into the inlet 33A of the final ingredient accommodating portion 33 through the second main channel 312 may flow to the second connecting channel 42 through the outlet 33B together with the third additive accommodated in the final ingredient accommodating portion 33.

The fluid (the mixture of the water and the first, second, and third additives) discharged through the second main channel 42 may be guided to the main channel connecting portion 115 of the fermentation module 1 and then introduced into the fermentation container 12.

However, the configuration of the ingredient supplier is not limited thereto. For example, when the intermediate ingredient accommodating portion is not provided, two ingredient accommodating portions may be provided in the ingredient supplier 3. In this case, one ingredient accommodating portion may be the initial ingredient accommodating portion, and the other ingredient accommodating portion may be the final ingredient accommodating portion. The outlet of the initial ingredient accommodating portion and the inlet of the final ingredient accommodating portion may be connected to each other by the connecting channel.

For another example, when the intermediate ingredient accommodating portion is provided in plurality, four or more ingredient accommodating portions may be provided in the ingredient supplier 3. In this case, one ingredient accommodating portion may be the initial ingredient accommodating portion, the other ingredient accommodating portion may be the final ingredient accommodating portion, and the remaining ingredient accommodating portion may be the intermediate ingredient accommodating portion. In this case, since the connection between the ingredient accommodating portions in series is easily understood by the person skilled in the art, their detailed descriptions will be omitted.

Since the plurality of ingredient accommodating portions 31, 32, and 33 are connected in series to each other, the channel configuration of the ingredient supplier 3 may be simplified.

Also, since the additives contained in the capsules C1, C2, and C3 are extracted at once, a time taken to extract the additives may decrease. Also, since the user does not have to worry about the mounting order of the capsules C1, C2, and C3, malfunction due to the mounting of the capsules C1, C2, and C3 in erroneous order may not occur. Also, the ingredient supplier 3 may be minimized in water leakage point to improve reliability.

When the ingredients accommodated in the ingredient supplier 3 are accommodated in the capsules C1, C2, and C3, the initial ingredient accommodating portion 31 may be called an initial capsule mounting portion, the intermediate ingredient accommodating portion 32 may be called an intermediate capsule mounting portion, and the final ingredient accommodating portion 33 may be a final capsule mounting portion.

Hereinafter, the water supply module 5 will be described in detail.

The water supply module 5 may include a water tank 51, a water supply pump 52 for pumping water within the water tank 51, and a water supply heater 53 for heating the water pumped by the water supply pump 52.

The water supply module 5 may further include the water supply pump 52 for pumping water within the water tank 51 and the water supply heater 53 for heating the water pumped by the water supply pump 52.

The water tank 51 and the water supply pump 52 may be connected to a water tank discharge channel 55A, and the water contained in the water tank 51 may be introduced into the water supply pump 52 through the water tank discharge channel 55A.

The water supply pump 52 and one end of the first main channel 41 may be connected to a water supply channel 55B, and the water discharged from the water supply pump may be guided to the first main channel 41 through the water supply channel 55B.

A flow meter 56 for measuring a flow rate of the water discharged from the water tank 51 may be installed in the water tank discharge channel 55A.

Also, a flow rate control valve 54 for controlling the flow rate of the water discharged from the water tank 51 may be installed in the water tank discharge channel 55A. The flow rate control valve 54 may include a step-in motor.

Also, a thermistor 54A for measuring a temperature of the water discharged from the water tank 51 may be installed in the water tank discharge channel 55A. The thermistor 54A may be built in the flow rate control valve 54.

A water supply check valve 59 for preventing the water from flow back to the water supply pump 52 may be installed in the water supply channel 55B.

The water supply heater 53 may be installed in the water supply channel 55B.

The water supply heater 53 may be a mold heater and include a heater case through which the water pumped by the water supply pump 52 passes and a heat generation heater installed in the heater case to heat the water introduced into the heater case.

A thermal fuse 58 for interrupting a circuit to cutoff current applied to the water supply heater 53 when a temperature is high may be installed in the water supply heater 53.

The water supply module 5 may further include a safety valve 53A. The safety valve 53A may communicate with the inside of the heater case of the water supply heater 53. The safety valve 53A may restrict a maximum internal pressure of the heater case. For example, the safety valve 53A may restrict a maximum internal pressure of the heater case to a pressure of about 3.0 bar.

The water supply module 5 may further include a water supply temperature sensor 57 for measuring a temperature of the water passing through the water supply heater 53. The water supply temperature sensor 57 may be installed in the water supply heater 53. Alternatively, the water supply temperature sensor 57 may be disposed at a portion of the water supply channel 55B behind the water supply heater 53 in the flow direction of the water. Also, the water supply temperature sensor 57 may be installed in the first main channel 41.

When the water supply pump 52 is driven, the water within the water tank 51 may be introduced into the water supply pump 52 through the water tank discharge channel 55A, and the water discharged from the water supply pump 52 may be heated in the water supply heater 53 while flowing through the water supply channel 55B and then be guided to the first main channel 41.

Hereinafter, the beverage dispenser 6 will be described.

The beverage dispenser 6 may be connected to the second main channel 42.

In more detail, the beverage dispenser 6 may include a dispenser 62 for dispensing the beverage and a beverage dispensing channel 61 connecting to the dispenser 62 to the second main channel 42.

The beverage dispensing channel 61 may have one end 61A connected between the main check valve 314 and the main valve 40 with respect to the second main channel 42 and the other end connected to the dispenser 62.

A beverage dispensing valve 64 opening and closing the beverage dispensing channel 61 may be installed in the beverage dispensing channel 61.

The beverage dispensing valve 64 may be opened when the beverage is dispensed to open the beverage dispensing channel 61. The beverage dispensing valve 64 may be opened when residual water is removed to open the beverage dispensing channel 61. The beverage dispensing valve 64 may be opened when the beverage dispenser is cleaned to open the beverage dispensing channel 61.

An anti-foaming member (not shown) may be provided in the beverage dispensing channel 61, and an amount of foam of the beverage flowing from the second main passage 42 to the beverage dispensing channel 61 may be minimized while passing through the anti-foaming part. A mesh for filtering the foam may be provided in the anti-foaming member.

When the beverage is dispensed, the beverage dispensing valve 64 may be opened. When the beverage is not dispensed, the closed state of the beverage dispensing valve 64 may be maintained.

Hereinafter, the gas discharger 7 will be described in detail.

The gas discharger 7 may be connected to the fermentation module 1 to discharge a gas generated in the fermentation container 12.

In more detail, the gas discharger 7 may include a gas discharge channel 71 connected to the fermentation module, a gas pressure sensor 72 installed in the gas discharge channel 71, and a gas discharge valve 73 connected behind the gas pressure sensor 72 in the gas discharge channel 71 in the gas discharge direction.

The gas discharge channel 71 may be connected to the fermentation module 1, particularly, the fermentation lid 107. A gas discharge channel connecting portion 121 to which the gas discharge channel 71 is connected may be provided in the fermentation lid 107.

The gas within the fermentation container 12 may flow into the gas discharge channel 71 and the gas pressure sensor 72 through the gas discharge channel connecting portion 121. The gas pressure sensor 72 may detect a pressure of the gas discharged to the gas discharge channel 71 through the gas discharge channel connecting portion 121 within the fermentation container 12.

The gas discharge valve 73 may be turned to be opened when the air is injected into the fermentation container 12 by the air injector 8. The beverage maker may uniformly mix the malt with the water by injecting the air into the fermentation container 12. Here, foam generated in the liquid malt may be discharged from the upper portion of the fermentation container 12 to the outside through the gas discharge channel 71 and the gas discharge valve 73.

The gas discharge valve 73 may be turned on to detect fermentation during the fermentation process and then tuned off to be closed.

The gas discharger 7 may further include the safety valve 75 connected to the gas discharge channel 71. The safety valve 75 may be connected behind the gas pressure sensor 71 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76.

The pressure release valve 76 may be connected to the gas discharge channel 71. The pressure release valve 76 and the gas discharge valve 73 may be selectively opened/closed.

The gas discharge channel 71 may be branched to be respectively connected to the gas discharge valve 73 and the pressure release valve 76.

A noise reducing device 77 may be mounted on the pressure release valve 76. The noise reducing device 77 may include at least one of an orifice structure and a muffler structure.

Even though the pressure release valve 76 is opened, the internal pressure of the fermentation container 12 may gradually decrease by the noise reducing device 77.

When the fermentation of the beverage progresses, the pressure release valve 76 may be opened to release the pressure in the state in which the internal pressure of the fermentation container 12 increases. The noise reducing device 77 may effectively reduce noise generated due to a difference in pressure of the inside and outside of the fermentation container 12.

The pressure release valve 76 may be controlled to be opened/closed while the beverage ingredients are fermented.

Hereinafter, the air injector 8 will be described.

The air injector 8 may be connected to the water supply module 55B or the first main channel 41 to inject air. Hereinafter, for convenience of description, the case in which the air injector 8 is connected to the water supply channel 55B will be described as an example.

The air injector 8 may be connected to an opposite side of a sub channel 91, which will be described later, with respect to the water supply heater 53.

In this case, the air injected into the air injector 8 may pass through the water supply heater 53 to flow to the sub channel 91 together with the residual water within the water supply heater 53. Thus, the residual water within the water supply heater 53 may be removed to maintain a clean state of the water supply heater 53.

Alternatively, the air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supplier 3 to flow to the capsule mounting portions 31, 32, and 33. The residual water or residues within the capsules C1, C2, and C3 or the capsule mounting portions 31, 32, and 33 may flow the second main channel 42 by the air injected by the air injector 8. The capsules C1, C2, and C3 and the capsule mounting portions 31, 32, and 33 may be cleanly maintained by the air injected by the air injector 8.

The air injector 8 may include an air injection channel connected to the water supply channel 55B or the first main channel 41 and an air pump 82 connected to the air injection channel 81. The air pump 82 may pump the air to the air injection channel 81.

An air injection check valve 83 preventing the water flowing to the water supply channel 55B by the water supply pump 52 from being introduced into the air pump 82 through the air injection channel 81 may be installed in the air injection channel 81.

The air injector 8 may further include an air filter 82A. The air filter 82A may be provided in a suction side of the air pump 82, and thus, external air may be suctioned into the air pump 82 by passing through the air filter 82A. Thus, the air pump 82 may inject clean air into the air injection channel 81.

Hereinafter, the air controller 15 will be described in detail.

The air controller 15 may control a pressure between an inner wall of the fermentation tank 112 and an outer surface of the fermentation container 12.

The air controller 15 may supply air into a space between the fermentation container 12 and the fermentation tank 112. On the other hand, the air controller 15 may exhaust the air within the space between the fermentation container 12 and the fermentation tank 112 to the outside.

The air controller 15 may include an air supply channel 154 connected to the fermentation module 1 and an exhaust channel 157 connected to the air supply channel 154 to exhaust the air to the outside.

The air supply channel 154 may have one end connected to the first main channel 41 and the other end connected to the fermentation module 1.

The air supply channel 154 may be connected to the fermentation module 1, particularly, the fermentation lid 107. An air supply channel connecting portion 117 to which the air supply channel 154 is connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154.

The air injector 8 may function as an air supplier for supplying the air into the space between the fermentation container 12 and the fermentation tank 112 together with the air supply channel 154.

As described above, the air supplied into the fermentation tank 112 may press the fermentation container 12 between the outer surface of the fermentation container 12 and the inner wall of the fermentation tank 112.

The beverage within the fermentation container 12 may be pressed by the fermentation container 12 that is pushed by the air. When the main valve 40 and the beverage dispensing valve 64 are opened, the beverage may pass through the main channel connecting portion 115 to flow the second main channel 42. The beverage flowing from the fermentation container 12 to the second main channel 42 may be dispensed to the outside through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may occur between the fermentation container 12 and the fermentation tank 112.

The air pump 82 may be maintained in the turn-off state while the beverage is dispensed. When the beverage is completely dispensed, the air pump 82 may be driven for next beverage dispensing and then stopped.

Thus, when the beverage is completely made, he beverage maker may dispense the beverage within the fermentation container 12 to the beverage dispensing channel module 6 in the state in which the fermentation container 1 is disposed within the fermentation module 1 without withdrawing the fermentation container 12 to the outside of the fermentation module 1.

The air controller 15 may include a separate air supply pump with respect to the air injector 8. In this case, the air supply channel 154 may be connected to the air supply pump, but may not connected to the first main channel 41. However, the injection of the air into the fermentation container 12 by the air pump 82 and the supplying of the air into the space between the fermentation container 12 and the fermentation tank 112 may be combined with each other to realize a compact product and reduce a manufacturing cost.

The exhaust channel 157 may function as an air exhaust passage, through which the air between the fermentation container 12 and the fermentation tank 112 is exhausted to the outside, together with a portion of the air supply channel 154.

The exhaust channel 157 may be disposed outside the fermentation module 1. The exhaust channel 157 may be connected to a portion of the air supply channel 154, which is disposed outside the fermentation tank 112.

The air supply channel 154 may include a first channel connected between a connecting portion 157A connected to the first main channel 41 and the exhaust channel 157 and a second channel connected between the connecting portion 154A connected to the exhaust channel 157 and the air supply channel connecting portion 117. The first channel may be an air supply channel for guiding the air pumped by the air pump 82 to the second channel. Also, the second channel may be an air supply and exhaust-combined channel for supplying the air passing through the air supply channel into the space between the fermentation tank 112 and the fermentation container 12 or guiding the air discharged from the space between the fermentation tank 112 and the fermentation container 12 t the connecting channel 157.

The exhaust channel 157 may be connected to the exhaust valve 156 for opening and closing the exhaust channel 157.

The exhaust valve 156 may be opened so that the air between the fermentation container 12 and the fermentation tank 112 is exhausted to the outside when the fermentation container 12 is expanded while the beverage is made. The exhaust valve 156 may be controlled to be opened when the water is supplied by the water supply module 5. The exhaust valve 156 may be controlled to be opened when the air is injected by the air injection channel module 8.

The exhaust valve 156 may be opened so that the air between the fermentation container 12 and the fermentation tank 112 is exhausted when the beverage within the fermentation container 12 is completely dispensed. The user may take the fermentation container out of the fermentation tank 112 when the beverage is completely dispensed. This is done because safety accidents occur when the inside of the fermentation tank 112 is maintained at a high pressure. The exhaust valve 156 may be controlled to be opened when the beverage within the fermentation container 12 is completely dispensed.

The air controller 15 may further include an air supply valve 159 that restricts the air pumped by the air pump 82 and supplied between the fermentation container 12 and the fermentation tank 112.

The air supply valve 159 may be installed in the air supply channel 154. In more detail, the air supply valve 159 may be installed between the connecting portion 154A of the first main channel 41 and the connecting portion 157A of the exhaust channel 157 in the air supply channel 154.

Hereinafter, the sub channel 91 will be described in detail.

The sub channel 91 may connect the water supply module 5 to the beverage dispenser 6. In more detail, the sub channel 91 may have one end 91A connected to the water supply channel 55B and the other end 91B connected to the beverage dispensing channel 61.

The sub channel 91 may be connected between the water supply pump 52 and the water supply heater 53 with respect to the water supply channel 55B.

Also, the sub channel 91 may be connected to the connecting portion 61A of the second main channel 42 and the beverage dispensing valve 64 with respect to the beverage dispensing channel 61.

The water supplied by the water supply pump 52 and the air pumped by the air pump 82 may be guided to the beverage dispensing channel 61 through the sub channel 91 and then be dispensed to the dispenser 62. Thus, the residual water or the beverage remaining in the beverage dispenser 6 may be removed.

A sub valve 92 opening and closing the sub channel 91 may be installed in the sub channel 91.

The sub valve 92 may be opened when the beverage is dispensed, or the cleaning is performed to open the sub channel 91.

Also, a sub check valve 93 for preventing the beverage of the beverage dispensing channel 61 from flowing back to the water supply module 5 may be installed in the sub channel 91. The sub check valve 93 may be disposed between the sub valve 92 and the beverage dispensing channel 61 with respect to the sub channel 91.

The sub channel 91 may function as a residual water removing channel of the water supply module 5. For example, when the air pump 82 is turned on in the state in which the air supply valve 159, the bypass valve 35, and the ingredient supply valve 310 are closed, the sub valve 92 is opened, the air injected into the air injection channel 81 may pass through the water supply heater 53 to flow to the sub channel 91. Then, the air may pass through the sub valve 92 to flow to the beverage dispensing channel 61 and then be dispensed to the dispenser 62. In this process, the air may be dispensed together with the water supply module 5, more particularly, the residual water remaining the water supply heater 53 and the water supply channel 55B so that residual water is removed.

In addition, the sub channel 91 may function as a cleaning channel. This will be described in detail in cleaning steps S100 and S1100 and a dispenser cleaning process of a beverage dispensing step S1000, which will be described later.

Figure 3:
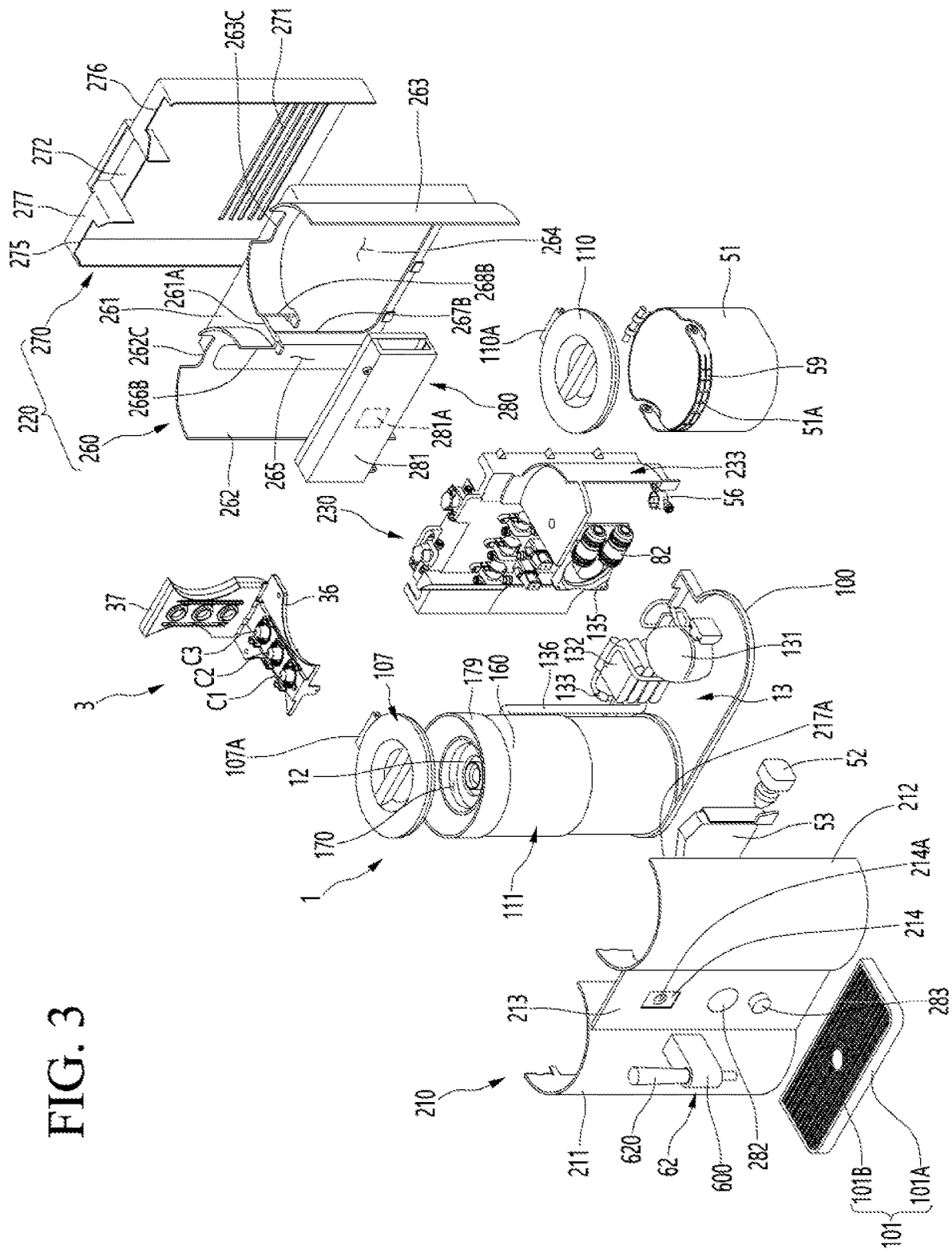
FIG. 3 is an exploded perspective view of the beverage maker shown in FIG. 2.

FIG. 2 is a perspective view of a beverage maker according to an embodiment of the present disclosure, and FIG. 3 is an exploded perspective view of the beverage maker shown in FIG. 2.

The beverage maker may include a base 100. The base 100 may define the appearance of the bottom of the beverage maker, and support a fermentation module 1, the refrigerant cycle device 13, a water supply heater 53, a water supply pump 52 and a main frame 230 located thereabove.

The beverage maker may further include a beverage container 101 capable of receiving and storing the beverage dropped from the dispenser 62. The beverage container 101 may be formed integrally with the base 100 or may be coupled to the base 100.

The beverage container 101 may include a container body 101A having formed therein a space in which the beverage dropped from the dispenser 62 is accommodated. The beverage container 101 may include a container upper plate 101b disposed on an upper surface of the container body 101A to cover the space in the container body 101A.

The container body 101A may be formed to protrude forward from the front portion of the base 100. The container body 101A may have an opened upper surface.

In the container upper plate 101B, a plurality of holes, through which the beverage is dropped into the container body 101A.

The beverage dropped around a beverage container (not shown) of the beverage dropped from the dispenser 62 may be dropped into the container upper plate 101B, and may be temporarily stored in the beverage container 101 through the holes of the container upper plate 101B, thereby keeping the vicinity of the beverage maker clean.

The fermentation module 1 may be formed in an approximately cylindrical shape. The fermentation module 1 may be supported from the bottom by the base 100.

The fermentation module 1 may be disposed on the base 100. In this case, the fermentation module 1 may be directly seated on the base 100, or may be disposed on the base 100 and supported by a separate fermentation module supporter (not shown) seated on the base 100.

The fermentation module 1 may include a fermentation tank module 111 having an opening 170 formed therein and a fermentation lid 107 covering the opening 170. As described above, the fermentation container 12 may be accommodated in the fermentation tank module 111.

The fermentation tank 112 may be accommodated in the fermentation case 160. Insulation may be located between the fermentation tank 112 and the fermentation case 160 to insulate the fermentation tank 112. In this case, the evaporator 134 (see FIG. 1) and the heater 14 (see FIG. 1) may be located between the insulation and the fermentation tank 112. That is, the insulation may surround the evaporator 134 and/or the heater 14 along with the fermentation tank 112, thereby easily controlling the temperature of the fermentation tank 112.

The fermentation lid 107 may be disposed on the fermentation tank module 111 and open and close the opening 170 of the fermentation tank module 111 from above.

The fermentation tank module 111 may further include a lid seating body 170 on which the fermentation lid 107 is seated. The lid seating body 179 may be disposed on the fermentation case 160 to support the fermentation lid 107 from the bottom.

The fermentation case 160 may define the appearance of a portion of the lower side of the fermentation module 1, and the fermentation lid 107 may define the appearance of a portion of the upper side of the fermentation module 1.

The fermentation case 160 may be placed on the base 100.

The fermentation lid 107 may be detachably, slidably or rotatably connected to the fermentation tank module 111. For example, the fermentation lid 107 may be hinge-connected to the fermentation tank module 111.

The fermentation lid 107 may be provided with a first hinge connector 107A protruding rearward, and the first hinge connector 107A may be hinge-connected to the fermentation tank module 111.

The refrigerant cycle device 13 may include a compressor 131, a condenser 132, an expansion mechanism 133 and an evaporator 134 (see FIG. 1). The beverage maker may further include a blower 135 for cooling the condenser 132.

The refrigerant cycle device 13 may be composed of a heat pump. The refrigerant cycle device 13 may include a refrigerant channel switching valve (not shown). The refrigerant channel switching valve may be composed of a four-way value. The refrigerant channel switching valve may be connected to a suction channel of the compressor 131 and a discharge channel of the compressor 131, may be connected to the condenser 132 through a condenser connecting channel, and may be connected to the evaporator 134 through an evaporator connecting channel.

The refrigerant channel switching valve may guide the refrigerant compressed by the compressor 131 to the condenser 132 and guide the refrigerant flowing from the evaporator 134 to the compressor 131, upon cooling the fermentation tank 112.

The refrigerant channel switching valve may guide the refrigerant compressed by the compressor 131 to the evaporator 134 and guide the refrigerant flowing from the condenser 132 to the compressor 131, upon heating the fermentation tank 112.

The base 100 may support at least a portion of the refrigerant cycle device 13. For example, the compressor 131 and the condenser 132 of the refrigerant cycle device 13 may be supported by the base 100.

In addition, the fermentation module 1 may be connected with a pipe 136. A part of a refrigerant pipe configuring the refrigerant cycle device 13 (see FIG. 1) may be built in the pipe 136. More specifically, a refrigerant pipe connecting the expansion mechanism 133 and the evaporator 134 (see FIG. 1) may be built in the pipe 136.

The water tank 51 may be disposed above the base 100 and may be spaced apart from the base 100. The water tank 51 may be spaced apart from the base 100 in a vertical direction by a water tank supporter 233 which will be described later.

The water tank 51 may be spaced apart from the fermentation module 1 in a horizontal direction. More specifically, the water tank 51 and the fermentation module 1 may be spaced apart from each other in a left-and-right direction.

The upper surface of the water tank 51 may be opened. The front and rear surfaces of the water tank 51 may be curved surfaces rounded in a horizontal direction, and both sides of the water tank 51 may be flat surfaces. In this case, the curvature of the front and rear surfaces of the water tank 51 may be equal to that of the outer circumferential surface of the fermentation module 1.

However, the present disclosure is not limited thereto and the shape of the water tank 51 may be changed as necessary. For example, the water tank 51 may be formed in a hollow cylindrical shape and with an opened upper surface.

The water tank 51 may be provided with a water tank handle 59. The water tank handle 59 may be rotatably connected to the water tank 51. More specifically, both ends of the water tank handle 59 may be hinge-connected to both sides of the water tank 51.

A user may lift the water tank 51 by holding the water tank handle 59 in a state of rotating the water tank handle 59 upward.

A stepped portion 51a may be formed on the upper end of the water tank 51. By forming a portion of the upper end of the water tank 51 to be stepped, the stepped portion 51a may be a portion with a lower height than the remaining upper portion. The stepped portion 51a may be formed by forming a portion of the front side of the upper end of the water tank 51 to be stepped.

The water tank handle 59 may be provided to be in contact with the stepped portion 51*a*. In this case, the width of the water tank handle 59 may be equal to the height of the step of the stepped portion. In addition, the water tank handle 59 may include a bent portion and the curvature of the bent portion may be equal to that of the front surface of the water tank 51.

The beverage maker may further include a water tank lid 110 covering the opened upper surface of the water tank 51. The water tank lid 110 may open and close the internal space of the water tank 51.

The water tank lid 110 may be rotatably connected to the water tank 51.

The water tank lid 110 may be provided with a second hinge connector 110A protruding rearward, and the second hinge connector 110A may be hinge-connected with the water tank 51.

The water tank lid 110 may be formed in the same or similar shape as the fermentation lid 107. This may allow the beverage maker to have a sense of unity in design and allow the same part to be used as the water tank lid 110 and the fermentation lid 107.

A height from the base 100 to the fermentation lid 107 may be equal to a height from the base 100 to the water tank lid 110. More specifically, a height between the base 100 and the upper surface of the fermentation lid 107 may be equal to a height between the base 100 and the upper surface of the water tank lid 110.

Meanwhile, the beverage maker may further include an outer case 200.

The outer case 200 may be placed on the base 100.

The outer case 200 may define the appearance of the beverage maker.

The outer case 200 may include a fermentation module cover 201 covering the fermentation module 1 and a water tank cover 202 covering the water tank 51. The fermentation module cover 201 and the water tank cover 202 may be formed in a hollow cylindrical shape. A portion of the circumferential surface of the fermentation module cover 201 and the water tank cover 202 may be open.

The fermentation module cover 201 and the water tank cover 202 may surround at least a portion of the outer circumferences of the fermentation module 1 and the water tank 51, respectively. The fermentation module cover 201 and the water tank cover 202 may respectively fix and protect the fermentation module 1 and the water tank 51 from external impact.

The fermentation module cover 201 and the water tank cover 202 may be disposed to be spaced apart from each other in a horizontal direction.

The heights and/or diameters of the fermentation module cover 201 and the water tank cover 202 may be equal to each other. Therefore, the design of the appearance of the beverage maker may be improved by a symmetrical structure and unity.

The outer case 200 may be constructed by coupling a plurality of members. The outer case 200 may include a front cover 210 and a rear cover 220.

The front cover 210 may be disposed at the front side of the fermentation module 1, the water tank 51 and the main frame 230, and the rear cover 220 may be disposed at the rear side of the fermentation module 1, the water tank 51 and the main frame 230.

The front cover 210 may define the appearance of the front side of the beverage maker.

The dispenser 62 may be on the front cover 210. The dispenser 62 may be disposed closer to the upper end than the lower end of the front cover 210. The dispenser 62 may be located above the beverage container 101. The user may open the dispenser 62 to take out the beverage.

The front cover 210 may be constructed by coupling a plurality of members.

The front cover 210 may include a front fermentation module cover 211, a front water tank cover 212 and a center cover 213.

The front fermentation module cover 211 may cover a portion of the front side of the outer circumference of the fermentation module 1. The front fermentation module cover 211 may be a portion of the front side of the fermentation module cover 201.

The front fermentation module cover 211 may configure the fermentation module cover 201 along with the rear fermentation module cover 262 of the rear cover 220. That is, the fermentation module cover 201 may include the front fermentation module cover 211 and the rear fermentation module cover 262. The front fermentation module cover 211 and the rear fermentation module cover 262 may be fastened to each other.

The rear fermentation module cover 262 may cover a portion of the rear side of the fermentation module 1. The rear fermentation module cover 262 may be a portion of the rear side of the fermentation module cover 201. The rear fermentation module cover 262 may be located behind the front fermentation module cover 211.

Meanwhile, the front water tank cover 212 may cover the front surface of the water tank 51. The front water tank cover 212 may be a portion of the front side of the water tank cover 202.

The front water tank cover 212 may configure the water tank cover 202 along with the rear water tank cover 263 of the rear cover 220. That is, the water tank cover 202 may include the front water tank cover 212 and the rear water tank cover 263. The front water tank cover 212 and the rear water tank cover 263 may be fastened to each other.

The rear water tank cover 263 may cover a portion of the rear side of the outer circumference of the water tank 51. The rear water tank cover 263 may be disposed behind the front water tank cover 212.

Meanwhile, the center cover 213 may be disposed between the front fermentation module cover 211 and the front water tank cover 212. Both sides of the center cover 213 may be in contact with the front fermentation module cover 211 and the front water tank cover 212, respectively.

The center cover 213 may have a flat plate shape disposed vertically.

The height of the center cover 213 may be equal to those of the front fermentation module cover 211 and the front water tank cover 212.

In the center cover 213, a dispensing valve mounting portion 214 in which the dispenser 62 is mounted may be formed. In the dispensing valve mounting portion 214, the dispenser body 600 of the dispenser 62 may be mounted. The dispensing valve mounting portion 214 may be formed closer to the upper end than the lower end of the center cover 213.

A through-hole 214A opened in a front-and-rear direction may be formed in the dispensing valve mounting portion 214. The beverage dispensing channel 61 or the dispenser channel may pass through the through-hole 214A to be connected to each other.

The beverage maker may include a display 282 for displaying a variety of information of the beverage maker. The display 282 may be disposed on the center cover 213.

The display 282 is preferably formed on the center cover 213 at a position not to be covered by the dispenser 62. That is, the display 282 may not overlap the dispenser 62 in the horizontal direction.

The display 282 may include a display device such as an LCD, an LED or an OLED. The display 282 may include a display PCB on which a display device is mounted. The display PCB may be mounted on the rear surface of the center cover 213, and may be electrically connected to a controller 281A which will be described later.

The beverage maker may include an input unit for receiving a command related to making of the beverage maker.

The input unit may include at least one of a touchscreen for receiving a command of a user using a touch method, a rotary knob which is held and rotated by the user or a button pressed by the user.

For example, the input unit may include a rotary knob 283. The rotary knob 283 may be disposed on the center cover 213. The rotary knob 283 may be disposed below the display 282.

The rotary knob 283 may function as a button pressed by the user. That is, the user may hold or rotate the rotary knob 283 or press the front surface of the rotary knob 283, thereby inputting a control command.

In addition, the input unit may include a touchscreen for receiving the command of the user using a touch method. The touchscreen may be provided on the display 282 and the display 282 may function as a touchscreen.

The input unit may be electrically connected with the controller 281A which will be described later.

In addition, the beverage maker may further include a wireless communication module (not shown). The type of the wireless communication module is not limited and, for example, the wireless communication module may include a Bluetooth module and a Wi-Fi module.

The wireless communication module may be disposed on the rear surface of the center cover 213.

The wireless communication module may be electrically connected with the controller 281A which will be described later. By the wireless communication module, the beverage maker may perform wireless communication with a separate mobile terminal. The user may input a command, inquire making information or monitor a making process in real time using the mobile terminal.

Meanwhile, the rear cover 220 may be coupled with the front cover 210, and an internal space of the outer case 200 may be formed between the rear cover 220 and the front cover 210.

The rear cover 220 may include a first rear cover 260 and a second rear cover 270.

The first rear cover 260 may be placed on the base 100, and the second rear cover 270 may be mounted behind the first rear cover 260.

An opening 264 opened in the front-and-rear direction may be formed in the first rear cover 260. More specifically, an opening 264 opened in the front-and-rear direction may be formed in a cover body 261. The opening 264 may be formed to face the main frame 230, which will be described later, in the front-and-rear direction. Therefore, the user may approach the inside of the beverage maker without removing the first rear cover 260.

The first rear cover 260 may include the cover body 261, the rear fermentation module cover 262 and the rear water tank cover 263. As described above, the rear fermentation module cover 262 may configure the fermentation module cover 201 along with the front fermentation module cover 211, and the rear water tank cover 263 may configure the water tank cover 202 along with the front water tank cover 212.

The rear fermentation module cover 262 and the rear water tank cover 263 may be mounted in the cover body 261. The rear fermentation module cover 262 and the rear water tank cover 263 may be mounted at the front side of the cover body 261.

A portion of the upper surface of the cover body 261 may be located between the rear fermentation module cover 262 and the rear water tank cover 263.

Avoidance grooves 262C and 263C may be formed in the upper ends of the rear fermentation module cover 262 and the rear water tank cover 263. A first avoidance groove 262C formed in the rear fermentation module cover 262 may correspond to a first hinge connector 107A formed on the lid body 109 of the fermentation lid 107, and a second avoidance groove 263C formed in the rear water tank cover 263 may correspond to the second hinge connector 110A formed on the water tank lid 110.

The avoidance grooves 262C and 263C may avoid interference with the hinge connectors 107A and 110A.

A through-hole 262 may be formed in the rear fermentation module cover 262. The through-hole 265 may be formed long in an upper-and-lower direction and may be opened in the front-and-rear direction. By the through-hole 265, channels connected with the fermentation module 1 may not interfere with the rear fermentation module cover 262.

The cover body 261 may support the ingredient supplier 3. At least a portion of the ingredient supplier 3 may be placed on the upper surface of the cover body 261, and the cover body 261 may support the ingredient supplier 3 from below.

A connecting channel avoidance groove 261A for avoiding interference with the connecting channels 311 and 312 (see FIG. 1) of the ingredient supplier 3 may be formed in the cover body 261.

Meanwhile, the second rear cover 270 may be mounted behind the first rear cover 260. The second rear cover 270 may cover the opening 264 formed in the first rear cover 260.

The second rear cover 270 may be mounted in the cover body 261 of the first rear cover 260. The second rear cover 270 may be mounted to surround both sides of the first rear cover 260.

The second rear cover 270 may be configured such that the upper end thereof has the same height as the upper ends of the rear fermentation module cover 262 and the rear water tank cover 263.

At least one through-hole 271 may be formed in the rear cover 220, and more specifically, the second rear cover 270. The through-hole 271 may face the opening 264 and/or the through-hole 265 formed in the first rear cover 260 in the front-and-rear direction.

Gas discharged from the gas discharge valve 73 (see FIG. 1) or the pressure release valve 76 (see FIG. 1) may be discharged to the outside of the beverage maker through the through-hole 271. In addition, air exhausted from the exhaust valve 15 (see FIG. 1) may be discharged to the outside of the beverage maker through the through-hole 271.

The blower 135 may be disposed at the front side of the condenser 132. More specifically, the blower 135 may be disposed at a position overlapping the opening 264 and the through-hole 271 in the front-and-rear direction, and the condenser 132 may be located between the blower 135 and the through-hole 271. Air heat-exchanged in the condenser 132 by the blower 135 may be discharged to the outside of the outer case 200 by sequentially passing through the opening 264 and the through-hole 271.

An ingredient supplier accommodator 272 may be formed in the second rear cover 270.

The ingredient supplier accommodator 272 may be formed in the upper end of the second rear cover. A portion of the rear side of the ingredient supplier 3 may be accommodated in the ingredient supplier accommodator 272.

In addition, a third avoidance groove 275 and a fourth avoidance groove 276 may be formed in the second rear cover 270. The third avoidance groove 275 may correspond to the first avoidance groove 262C formed in the rear fermentation module cover 262, and the fourth avoidance groove 276 may correspond to the second avoidance groove 263C formed in the rear water tank cover 263.

Meanwhile, the ingredient supplier 3 may be disposed between the fermentation module 1 and the water tank 51. Therefore, the beverage maker may be manufactured more compactly as compared to the case where the ingredient supplier 3 is located at a position other than the space between the fermentation module 1 and the water tank 51, and the ingredient supplier 3 may be protected by the fermentation module 1 and the water tank 51.

At least a portion of both side surfaces of the ingredient supplier 3 may be a curved surface, and the curved surface may be in contact with the outer circumference of the fermentation module cover 201 and the outer circumference of the water tank cover 202.

The ingredient supplier 3 may be spaced apart from the base 100 at the upper side of the base 100 in the upper-and-lower direction. In addition, the ingredient supplier 3 may be located above the main frame 230.

The ingredient supplier 3 may be located between the front cover 210 and the rear cover 220 in the front-and-rear direction. The front surface of the ingredient supplier 3 may be covered by the center cover 213 of the front cover 210, and the rear surface thereof may be covered by the ingredient supplier accommodator 272 of the second rear cover 270.

The ingredient supplier 3 may be supported by the cover body 261 of the first rear cover 261 and the ingredient supplier accommodator 272 of the second rear cover 270.

The ingredient supplier 3 may include a capsule mounting body 36 having formed therein capsule mounting portions 31, 32 and 33 in which capsules C1, C2 and C3 are detachably mounted, and a lid module 37 covering the capsule mounting portions 31, 32 and 33.

The capsule mounting body 36 may be supported by the cover body 261 of the first rear cover 261 and an ingredient supplier supporting portion 273 of the second rear cover 270.

The lid module 37 may be slidably disposed on or rotatably connected to the capsule mounting body 36. The lid module 37 may be hinge-connected to the capsule mounting body 36.

The ingredient supplier 3 may be installed to be approximately located on the central upper portion of the beverage maker, and the user may rotate the lid module 37 of the ingredient supplier 3 upward, thereby easily mounting and detaching the capsules C1, C2 and C3.

Meanwhile, the beverage maker may include the main frame 230. At least some of the above-described valves and channels may be fixed to the main frame 230.

The main frame 230 may be located between the front cover 210 and the rear cover 220 in the front-and-rear direction. The main frame 230 may be disposed to be in contact with the outer circumference of the fermentation module 1.

The main frame 230 may be placed on the base 100. The main frame 230 may include a water tank supporter 233, and the water tank supporter 233 may separate the water tank 51 from the base 100 in the upper-and-lower direction.

At least a portion of the main frame 230 may be located below the ingredient supplier 3.

In the main frame 230, at least one of the water supply pump 52, the water supply heater 53, the blower 135 or the air pump 82 may be mounted. For example, the blower 135 and the air pump 82 may be mounted on the main frame 230, the water supply pump 52 and the water supply heater 53 may be mounted on the base 100.

The main frame 230 may partition the condenser 132 and the fermentation module 1, thereby preventing the temperature of the fermentation module 1 from increasing by heat of the condenser 132.

Meanwhile, the compressor 131 may be disposed between the base 100 and the water tank 51 in the upper-and-lower direction.

In addition, the water supply heater 53 and the water supply pump 52 may be disposed at the front side of the main frame 230. The condenser 132 may be disposed at the rear side of the blower 135 mounted in the main frame 230.

The condenser 132 may be disposed to face the blower 135 mounted on the main frame 230. The condenser 132 may be disposed at the rear side of the blower 135.

Meanwhile, the beverage maker may include a control module 280 for controlling the beverage maker.

The control module 280 may be an electrical part of the beverage maker. The control module 280 may be detachably mounted on the main frame 230.

The control module 280 may be disposed on the main frame 230. The control module 280 may be fastened to the rear surface of the main frame 230.

A PCB case 281 may be fastened to the main frame 230, thereby safely protecting a main PCB therein.

At least a portion of the control module 280 may be disposed to face the opening 264 formed in the first rear cover 260.

The control module 280 may include a main PCB and the PCB case 281 in which the main PCB is built. The main PCB may include a controller 281A for substantially controlling operation of the components of the beverage maker.

The controller 281A included in the control module 280 may be electrically connected with a wireless communication module. For example, the controller 281A may receive a command received through the wireless communication module, thereby making beverage. In addition, the controller 281A may transmit information on the beverage maker or made beverage from the wireless communication module to a separate mobile terminal.

In addition, the controller 281A may receive a command received through the input unit. For example, the controller 281A may make the beverage according to the command input by the rotary knob 283. In addition, the controller 281A may perform control to output a variety of information of the beverage maker on the display 282. For example, the controller 281A may display information such as the amount of dispensed beverage, the residual amount of beverage or beverage dispensing completion through the display 282.

The controller 281A may control at least one of the water supply pump 52, the water supply heater 53, the air pump 82 or a temperature controller 11. In addition, the controller 281A may control at least one of a flow rate control valve 54, an ingredient supply valve 310, a main valve 40, a bypass valve 35, an air supply valve 159, an exhaust valve 156, a beverage dispensing valve 64, a sub valve 92, a gas discharge valve 73 or a pressure release valve 76.

The controller 281A may receive at least one of values measured by a flow meter 56, a thermistor 54A, a water supply temperature sensor 57, a temperature sensor 16 or a gas pressure sensor 72.

More specifically, the controller 281A may detect the internal pressure of the fermentation container 12 by the gas pressure sensor 72 and detect the temperature of the fermentation tank 112 by the temperature sensor 16. The control module 280 may determine a degree of fermentation of the beverage using the detected pressure or temperature.

In addition, the controller 281A may detect the temperature of water supplied from the water supply module 5 to the first main channel 41 by the water supply temperature sensor 57, and control the water supply heater 53 according to the detected temperature of water.

In addition, the controller 281A may control the temperature controller 11, thereby maintaining the temperature of the fermentation tank 112 at an appropriate temperature.

In addition, the controller 281A may add at least one of a time when the dispenser 62 is opened, a time when the air pump 82 is driven or a time when the main valve 40 is turned on after the beverage is completely made. The controller 281A may calculate the amount of beverage dispensed from the fermentation container 12 according to the added time. The controller 281A may calculate the residual amount of beverage from the calculated amount of dispensed beverage. The controller 281A may determine whether the entire beverage in the fermentation container 12 has been dispensed, from the calculated residual amount of beverage. Upon determining that the entire beverage in the fermentation container 12 has been dispensed, the controller 281A may determine that beverage is completely dispensed.

In addition, the controller 281A may control overall operation of the beverage maker. This will be described in detail below.

Figure 4:
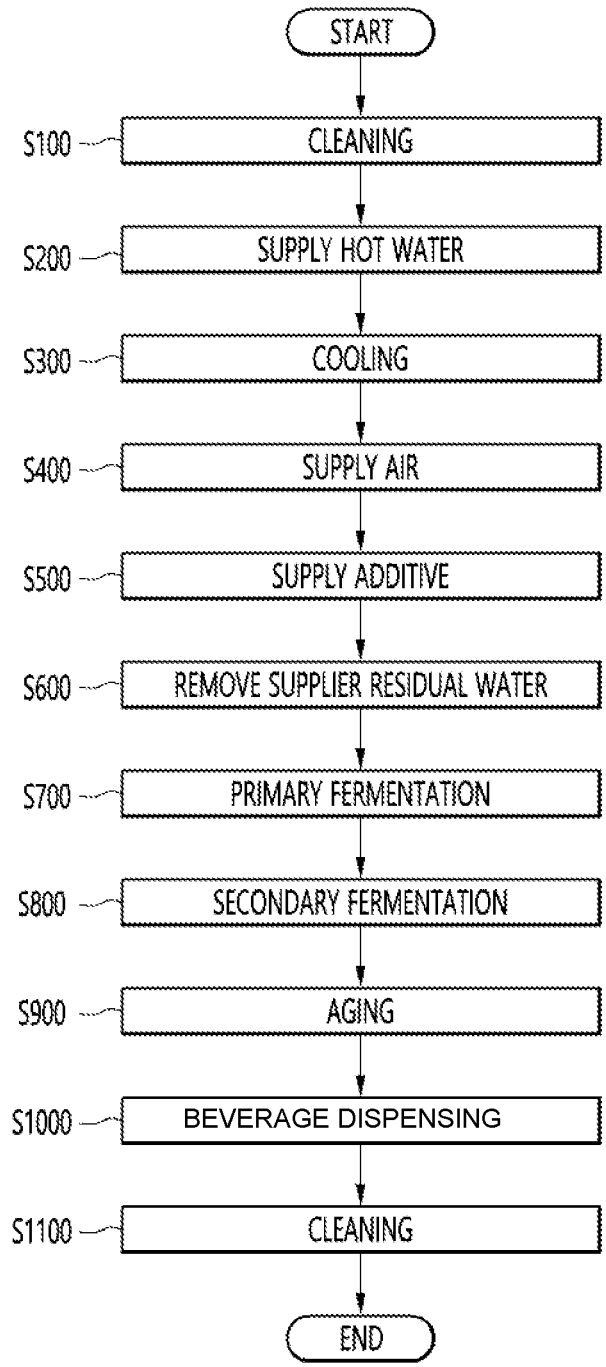
FIG. 4 is a flowchart illustrating a method of controlling a beverage maker according to an embodiment of the present disclosure.

FIG. 4 is a flowchart illustrating a method of controlling a beverage maker according to an embodiment of the present disclosure.

Hereinafter, operation of the beverage maker of the present embodiment will be described with reference to FIG. 4 and FIG. 1.

The beverage maker of the present embodiment may include steps S100 and S1100 of cleaning the channel therein. The cleaning steps S100 and S1100 may be performed separately a beverage making step.

The cleaning steps S100 and S1100 may be preferably performed before the beverage making step and after the beverage making step.

In addition, the cleaning steps S100 and S1100 may be performed by user input during the beverage making step, and, in this case, may be performed while the main valve 40 may be closed and an additive is not contained in the ingredient supplier 3 as in a first fermentation step S700 or a second fermentation step S800.

The cleaning steps S100 and S1100 may be performed in a state in which the capsules C1, C2 and C3 are not accommodated in the ingredient supplier 3.

In contrast, the beverage making step may be performed in a state in which the capsules C1, C2 and C3 are accommodated in the ingredient supplier 3 and the fermentation container 12 is accommodated in the fermentation tank 112.

The user may input a cleaning command through the input unit provided in the control module 280, a remote controller or a portable terminal. The controller 281A may control the beverage maker to perform the cleaning steps S100 and S1100 according to input of the cleaning command.

In addition, the user may input a beverage making command through the input unit provided in the control module 280, a remote controller or a portable terminal. The controller 281A may automatically control the beverage maker to perform the cleaning steps S100 and S1100, before and after the beverage making step according to input of the beverage making command.

Hereinafter, the cleaning step S100 performed before the beverage making step will be first described.

When the dispenser 62 is closed, the controller 281A may display a message to open the dispenser 62 on the display 282 and the user may open the dispenser 62.

When the dispenser 62 is opened and the cleaning command is input through the input unit, the remote controller or the portable terminal, the controller 281A may open the beverage dispensing channel 64 and turn on the water supply pump 52 and the water supply heater 53. In addition, the controller 281A may maintain the closed state of the main valve 40.

The controller 281A may perform cleaning of the ingredient supplier 3 and a bypass channel 4C. The controller 281A may open an ingredient supply valve 310 and a bypass valve 35. In addition, the controller 281A may perform cleaning of the sub channel 91. The controller 281A may open a sub valve 92.

When the water supply pump 52 is turned on, water of the water tank 51 may flow to the water supply heater 53 to be heated by the water supply heater 53.

Water (that is, hot water) heated by the water supply heater 53 may divisionally flow to the sub channel 91 and the first main channel 41.

Water flowing to the sub channel 91 may flow to the beverage dispensing channel 61 through the sub valve 92 and may pass through the beverage dispensing channel 64 to be dispensed through the dispenser 62.

In addition, water flowing to the first main channel 41 may divisionally flow to the ingredient supplier 3 and a bypass channel 43.

Water flowing to the ingredient supplier 3 may sequentially pass through the ingredient supply valve 310, an initial capsule mounting portion 31, an intermediate capsule mounting portion 32 and a final capsule mounting portion 33 to flow to the second main channel 43, and flow to the beverage dispensing channel 62 to pass through the beverage dispensing channel 64, thereby being dispensed through the dispenser 62.

Water flowing to the bypass channel 43 may pass through the bypass valve 35 to flow to the second main channel 43, and flow to the beverage dispensing channel 62 to pass through the beverage dispensing channel 64, thereby being dispensed through the dispenser 62.

During control described above, the main channels 41 and 42, the bypass channel 43, the sub channel 91, the beverage dispensing channel 64, the valves mounted in each channel and the dispenser 62 may be sterilized and cleaned. In addition, the capsule mounting portions 31, 32 and 33 and the connecting channels 311 and 312 may be sterilized and cleaned.

The beverage maker may perform cleaning during a cleaning set time and complete the cleaning process after the cleaning set time.

The controller 281A may turn off the water supply pump 52 and the water supply heater 53 after the cleaning set time has elapsed, and close all the beverage dispensing channel 64, the bypass valve 35, the ingredient supply valve 310 and the sub valve 92.

In addition, the beverage maker of the present embodiment may include a beverage making step of making beverage.

For the beverage making step, the user may open the fermentation lid 107 and insert the fermentation container 12 through the opening 170 such that the fermentation container is seated on the fermentation tank module 111. In this case, malt may be accommodated in the fermentation container 12. The malt may be accommodated in the form of barley malt.

Thereafter, the user may close the fermentation lid 107, and the fermentation container 12 may be accommodated in the fermentation tank module 111 and the fermentation lid 107. In this case, the inside of the fermentation tank 112 may be closed by the fermentation lid 107.

In addition, the user may insert the plurality of capsules C1, C2 and C3 into the ingredient supplier 3 and then cover the plurality of capsule mounting portions 31, 32 and 33 with the lid module 37, before and after the fermentation container 12 is seated.

The user may input a beverage making command through the input unit connected to the controller 281A, the remote controller or the mobile terminal. The controller 281A may control the beverage maker to perform the beverage making step according to input of the beverage making command.

The beverage making step may include a water supply step S200.

The water supply step S200 may be a liquid malt formation step of forming liquid malt by evenly mixing the malt in the fermentation container 12 with hot water.

The controller 281A may turn on the water supply pump 52 and the water supply heater 53 and maintain the closed state of the ingredient supply valve 310, during the water supply step S200. The controller 281A may open the bypass valve 35 and the main valve 40 during the water supply step S200.

Meanwhile, the controller 281A may open the exhaust valve 156 when water is supplied to the fermentation container 12.

During control, water discharged from the water tank 51 may pass through the water supply pump 52, and flow to the water supply heater 53, thereby being heated by the water supply heater 53. Water heated by the water supply heater 53 may flow from the first main channel 41 to the bypass channel 43, and pass through the bypass valve 35 to flow to the second main channel 42. Water flowing to the second main channel 42 may pass through the main valve 40 and flow into the fermentation container 12. Hot water flowing into the fermentation container 12 may be mixed the malt accommodated in the fermentation container 12, and the malt in the fermentation container 12 may be mixed with water, thereby being gradually diluted. When hot water is supplied to the fermentation container 12, the malt accommodated in the fermentation container 12 may be rapidly and evenly mixed with the hot water.

The fermentation container 12 may gradually expand when water is introduced, and some of air between the outer surface of the fermentation container 12 and the inner wall of the fermentation tank 112 may flow to the air supply channel 154 to be discharged through the exhaust valve 156, as the fermentation container 12 expands.

Therefore, while water flows into the fermentation container 12, the fermentation container 12 may be supplied with water inside the fermentation tank 112 without being burst or torn.

Meanwhile, during the water supply step S200, the water supply heater 53 preferably heats water to 50° C. to 70° C., and the controller 281A may control the water supply heater 53 according to the temperature detected by the water supply temperature sensor 57.

The controller 281A may perform the water supply step S200 until the quantity of accumulated water detected by the flow meter 56 reaches a set quantity and complete the water supply step S200 when the quantity of accumulated water detected by the flow meter 56 reaches the set quantity.

When the water supply step S200 is completed, the controller 281A may turn off the water supply pump 52 and the water supply heater 53 and close the bypass valve 35. The controller 281A may close the gas discharge valve 73 and the exhaust valve 156, when the water supply step S200 is completed.

Meanwhile, the controller 281A may perform control such that air is introduced into the fermentation container 12, during the water supply step S200.

The controller 281A may perform and stop primary supply of water to the fermentation container 12, perform and stop injection of air into the fermentation container 12, perform and stop secondary supply of hot water to the fermentation container 12, and complete the water supply step S200 after primary supply of water, air injection and secondary supply of water are sequentially completed.

As an example of the water supply step S200, only a hot water supply process of supplying hot water may be performed.

As another example of the water supply step S200, a primary hot water supply process of primarily supplying hot water, an air injection process of injecting air and a secondary hot water supply process of secondarily supplying hot water may be sequentially performed.

The case where the water supply step S200 performs only the hot water supply process as an example of the water supply step S200 is equal to the above description and thus a detailed description thereof will be omitted.

Hereinafter, as another example of the water supply step S200, the case where a primary hot water supply process, an air injection process and a secondary hot water supply process are sequentially performed as the water supply step S200 will be described.

The controller 281A may turn on the water supply pump 52 and the water supply heater 53, turn off the bypass valve 35 and the main valve 40, and maintain the closed state of the ingredient supply valve 310, when the primary hot water supply process starts. In addition the controller 281A may open the gas discharge valve 73 and the exhaust valve 156, when the primary hot water supply process starts.

During the primary hot water supply process, water may flow into the fermentation container 12, the fermentation container 12 may expand by the water, some of air between the fermentation container 12 and the fermentation tank 112 may be pushed by the expanded fermentation container 12 to flow to the air supply channel 154 and may be discharged to the outside through the exhaust valve 156.

In addition, the controller 281A may determine completion of the primary hot water supply process according to the flow rate detected by the flow meter 56 during the primary hot water supply process. The controller 281A may determine that the primary hot water supply process is completed when the flow rate detected by the flow meter 56 reaches a first set flow rate during the primary hot water supply process, turn off the water supply pump 52 and the water supply heater 53, and maintain the open state of the bypass valve 35 and the main valve 40. In addition, the controller 281A may maintain the open state of the gas discharge valve 73 and the exhaust valve 156, when the primary hot water supply process is completed.

When the primary hot water supply process is completed, the air injection process may be performed.

The controller 281A may turn on the air pump 82, when the air injection process starts. In addition, the controller 281A may maintain the closed state of the air supply valve 159.

While the air pump 82 is turned on, air injected into the air injection channel 81 may flow from the first main channel 41 to the second main channel 42 through the bypass channel 43, and passe through the main valve 40 to flow into the fermentation container 12. Air flowing into the fermentation container 12 may collide with the liquid malt, thereby helping to more evenly mix the malt with hot water.

As air is introduced into the fermentation container 12, the fermentation container 12 may expand, and some of air between the outer surface of the fermentation container 12 and the inner wall of the fermentation tank 112 may be pushed by the expanded fermentation container 12 to flow to the air supply channel 154, and may be discharged to the outside through the exhaust valve 156.

When the pressure detected by the gas pressure sensor 72 is equal to or greater than set pressure, the controller 281A may complete the air injection process and turn off the air pump 82 in order to complete the air injection process. The control module 280 may maintain the open state of the main valve 40, the bypass valve 35, the gas discharge valve 73 and the exhaust valve 156, when the air injection process is completed.

When the air injection process is completed, the secondary hot water supply process may be performed.

The controller 281A may turn on the water supply pump 52 and the water supply heater 53, when the secondary hot water supply process starts.

Water of the water tank 51 may be supplied to the fermentation container 12 as in the primary hot water supply process, and new hot water may be additionally supplied to the fermentation container 12.

During the secondary hot water supply, the fermentation container 12 may further expand by additionally introduced water, and some of air between the outer surface of the fermentation container 12 and the inner wall of the fermentation tank 112 may be pushed the expanded fermentation container 12 to flow to the air supply channel 154, and may be discharged to the outside through the exhaust valve 156.

The controller 281A may determine completion of the secondary hot water supply process according to the flow rate detected by the flow meter 56 during the secondary hot water supply process. When the flow rate detected by the flow meter 56 reaches a second set flow rate during the secondary hot water supply process, the controller 281A may determine that the secondary hot water supply process is completed, turn off the water supply pump 52 and the water supply heater 53, and close the main valve 40 and the bypass valve 35. In addition, when the secondary hot water supply process is completed, the controller 281A may close the gas discharge valve 73 and the exhaust valve 156.

Meanwhile, the beverage making step may include a fermentation tank cooling step S300.

More specifically, when the water supply step S200 is completed, the fermentation tank cooling step S300 of cooling the fermentation tank 112 may be performed.

The controller 281A may control the temperature controller 11 to cool the fermentation tank 112. More specifically, the controller 281A may control the refrigerant cycle device 13 to cool the fermentation tank 112. Refrigerant take heat out of the fermentation tank 112 while passing through the evaporator 134, thereby being evaporated. When the refrigerant cycle device 13 is driven, the fermentation tank 112 may be gradually cooled, and the fermentation container 12 accommodated in the fermentation tank 112 and the liquid malt accommodated in the fermentation container 12 may be cooled.

When the fermentation tank 112 is cooled, the evaporator 134 may cool the fermentation container 12, and the controller 281A may control the refrigerant cycle device 13 according to the temperature detected by the temperature sensor 16 mounted in the fermentation tank 112.

The controller 281A may control a compressor such that the temperature detected by the temperature sensor 16 is maintained at a set temperature (e.g., 35° C.). More specifically, the controller 281A may turn on the compressor of the refrigerant cycle device 13, when the temperature detected by the temperature sensor 16 exceeds a compressor on temperature (e.g., 35.5° C.). The control module 280 may turn off the compressor when the temperature detected by the temperature sensor 16 is equal to or less than a compressor off temperature (e.g., 34.5° C.).

During an additive supply step S500 which will be described below, since the water supply heater 53 is turned off, the temperature of the fermentation container 12 may decrease to be lower than a temperature set in the cooling step S300 by water supplied to the fermentation container 12 along with the additive. For example, until then, the temperature of the fermentation container 12 is maintained at about 35° C. and, when the additive and water are supplied to the fermentation container 12 together, the temperature of the fermentation container 12 may decrease to about 30° C. Accordingly, the set temperature during the cooling step S300 is preferably determined in consideration of temperature decrease.

The controller 281A may maintain the closed state of the exhaust valve 156 during the fermentation tank cooling step S300, air between the outer surface of the fermentation container 12 and the inner wall of the fermentation tank 112 is not discharged to the outside through the exhaust valve 156, and air in the fermentation tank 112 may be rapidly cooled.

Exceptionally, when the temperature of the fermentation container 12 is lower than the set temperature even in a state in which an external temperature is very low and the refrigerant cycle device 13 is turned off, the controller 281A may turn on the heater 14 located below the fermentation tank 112. When the temperature detected by the temperature sensor 16 is less than the heater on temperature, the controller 281A may turn on the heater 14. The control module 280 may turn off the heater when the temperature of the temperature sensor 16 is equal to or greater than the heater off temperature.

Meanwhile, the beverage making step may include an air supply step S400.

More specifically, the beverage maker may perform the air supply step S400 of supplying air to the fermentation container 12 and mixing the liquid malt, when the temperature detected by the temperature sensor 16 is equal to or less than the compressor off temperature at least once after the fermentation tank cooling step S300 starts and the compressor of the refrigerant cycle device 13 is turned on. Alternatively, the beverage maker may perform the air supply step S400 of supplying air to the fermentation container 12 and mixing the liquid malt, when the temperature detected by the temperature sensor 16 is equal to or greater than the heater off temperature at least once after the fermentation tank cooling step S300 starts and the heater 14 is turned on.

The beverage maker may control on and off of the refrigerant cycle device 13 and the heater 14 according to the temperature detected by the temperature sensor 16 during the air supply step S400, and on/off control of the refrigerant cycle device 13 and the heater 14 may continue until the additive supply step S500 is completed.

During the air supply step S400, the controller 281A may turn on the air pump 82 and turn off the bypass valve 35 and the main valve 40. In addition, the controller 281A may turn off the gas discharge valve 73 and the exhaust valve 156, and maintain the closed state of the air supply valve 159 and the ingredient supply valve 310.

While the air pump 82 is turned on, air injected into the air injection channel 81 may flow from the first main channel 41 to the second main channel 42 through the bypass channel 43, and pass through the main valve 40 to flow to the fermentation container 12. Air introduced into the fermentation container 12 may collide with the liquid malt to help to more evenly mix the malt with hot water, and air colliding with the liquid malt may supply oxygen to the liquid malt. That is, stirring and aeration may be performed.

While air is injected into the fermentation container 12, the fermentation container 12 may expand by air injected into the fermentation container 12. Some of air between the outer surface of the fermentation container 12 and the inner wall of the fermentation tank 112 may be pushed by the expanded fermentation container 12 to flow to the air supply channel 154, and may be discharged to the outside through the exhaust valve 156. Therefore, the fermentation container 12 may easily expand, and air of the second main channel 42 may be rapidly introduced into the fermentation container 12 to be mixed with the liquid malt.

The controller 281A may mix air with the liquid malt when the air pump 82 is turned on and during a mixing set time, and may complete the air supply step S400 when the air pump 82 is turned on and the mixing set time has elapsed. When the air supply step S400 is completed, the controller 281A may turn off the air pump 82 and close the bypass valve 35. In addition, the controller 281A may close the gas discharge valve 73 and the exhaust valve 156 when the air supply step S400 is completed.

The beverage making step may include an additive supply step S500.

More specifically, the beverage maker may perform the additive supply step S500 after the air supply step S400.

During the additive supply step S500, a first additive of the first capsule C1, a second additive of the second capsule C2 and a third additive of the third capsule C3 may be supplied to the fermentation container 12. In this case, the first capsule C1 may be mounted in an initial capsule mounting portion 31, the second capsule C2 may be mounted in the intermediate capsule mounting portion 32, and the third capsule C3 may be mounted in the final capsule mounting portion 33.

During the additive supply step S500, the controller 281A may turn on the water supply pump 52 and maintain the water supply heater 53 in the off state. In addition, the controller 281A may maintain the closed state of the bypass valve 35 and open the ingredient supply valve 310 and the main valve 40. In addition, the controller 281A may open the gas discharge valve 73 and the exhaust valve 156.

When the water supply pump 52 is turned on, water of the water tank 51 may pass through the water supply pump 52 and the water supply heater 53 to flow to the first main channel 41, and pass through the ingredient supply valve 310 to flow into the first capsule C1. Water flowing into the first capsule C1 may be mixed with the first additive accommodated in the first capsule C1 and flow into the first connecting channel 311 along with the first additive.

Fluid (a mixture of water and the first additive) introduced into the second capsule C2 through the first connecting channel 311 may be mixed with the second additive accommodated in the second capsule C2, and flow to the second connecting channel 312 along with the second additive.

Fluid (a mixture of water, the first additive and the second additive) introduced into the third capsule C3 through the second connecting channel 312 may be mixed with the third additive accommodated in the third capsule C3, and flow to the second main channel 42 along with the third additive.

Fluid (a mixture of water, the first additive, the second additive and the third additive) flowing to the second main channel 42 may pass through the main valve 40 and flow into the fermentation container 12. Therefore, all the additives contained in the capsules C1, C2 and C3 may be supplied to the fermentation container 12.

When the accumulated flow rate detected by the flow meter 56 reaches an additive supply set flow rate after the additive supply process S500 starts, the controller 281A may complete the additive supply process S500. When the additive supply process S500 is completed, the controller 281A may turn off the water supply pump 52.

The beverage making step may include an ingredient-supplier residual-water removing step S600.

More specifically, when the additive supply step S500 is completed, the ingredient-supplier residual-water removing step S600 of removing residual water in the ingredient supplier 3 may be performed.

During the ingredient-supplier residual-water removing step S600, the controller 281A may turn on the air pump 82 and maintain the closed state of the air supply valve 159. In addition, the controller 281A may perform control to open the ingredient supply valve 310 and the main valve 40. In addition, the controller 281A may perform control to open the gas discharge valve 73 and the exhaust valve 156.

When the air pump 82 is turned on, air injected into the air injection channel 81 may flow to the first main channel 41 and pass through the ingredient supply valve 310 to flow into the first capsule C1. Air flowing into the first capsule C1 may sequentially pass through the first capsule C1, the second capsule C2 and the third capsule C3 to blow out residual water into the second main channel 42. Air flowing to the second main channel 42 may flow into the fermentation container 12 along with residual water.

The additive and residual water remaining in the capsules C1, C2 and C3 may entirely flow into the fermentation container 12.

As residual water and air are injected from the second main channel 42 to the fermentation container 12, the fermentation container 12 may further expand, and some of air between the outer surface of the fermentation container 12 and the inner wall of the fermentation tank 112 may be pushed by the expanded fermentation container 12 to flow to the air supply channel 154 and may be discharged to the outside through the exhaust valve 156. Therefore, the fermentation container 12 may easily expand and air and residual water of the second main channel 42 may rapidly flow into the fermentation container 12.

The controller 281A may turn on the air pump 82 during a residual-water removing set time and complete ingredient-supplier residual-water removing step S600 when residual-water removing set time has elapsed.

When the ingredient-supplier residual-water removing step S600 is completed, the controller 281A may turn off the air pump 82 and close the ingredient supply valve 310 and the main valve 40. In addition, the controller 281A may close the gas discharge valve 73 and the exhaust valve 156.

When the ingredient-supplier residual-water removing step S600 is completed, the controller 281A may display a capsule removal message for removing the capsules C1, C2 and C3 on the display 282, and the user may remove the empty capsules from the ingredient supplier 3.

The beverage making step may include fermentation steps S700 and S800.

More specifically, after the ingredient-supplier residual-water removing step S600 is completed, a primary fermentation step S700 and a secondary fermentation step S800 may be sequentially performed.

According to an example of the primary fermentation step S700, the primary fermentation step S700 may include a pre-fermentation process and a main fermentation process. The main fermentation process may be performed after the pre-fermentation process is completed.

The pre-fermentation process is a process of rapidly and actively activating yeast supplied to the fermentation container 12 during the additive supply step S500.

The controller 281A may control the refrigerant cycle device 13 and the heater 14 such that the temperature measured by the temperature sensor 16 is maintained at a pre-fermentation target temperature (e.g., 30° C.) during the pre-fermentation process. The controller 281A may periodically open and close the gas discharge valve 73 after the pre-fermentation process starts, and store a pressure value detected by the gas pressure sensor 72 in a storage unit (not shown) immediately after the gas discharge valve 73 is closed. The controller 281A may calculate a pressure change by comparing the stored pressure value with a pressure value detected after a predetermined time elapses in a state in which the gas discharge valve 73 is closed. When the calculated pressure change exceeds pre-fermentation set pressure, the controller 281A may determine that pre-fermentation is completed and complete the pre-fermentation process.

The controller 281A may start the main fermentation process when the main fermentation process is completed.

The controller 281A may control the refrigerant cycle device 13 and the heater 14 such that the temperature measured by the temperature sensor 16 is maintained at a main fermentation target temperature (e.g., 21° C.) during the main fermentation process. In this case, the main fermentation target temperature may be higher than the pre-fermentation target temperature.

The control module 280 may periodically open and close the gas discharge valve 73 after the main fermentation process starts, and store the pressure detected by the gas pressure sensor 72 in a storage unit (not shown) while the gas discharge valve 73 is closed. When a pressure change periodically detected by the gas pressure sensor 72 exceeds the main fermentation set pressure, the control module 280 may determine that main fermentation is completed and completes the primary fermentation step S700.

However, the primary fermentation step S700 is not limited thereto, and, according to another example of the primary fermentation step S700, the primary fermentation step S700 may include only the main fermentation process without the pre-fermentation process. The description thereof is repeated and thus will be omitted.

Meanwhile, the controller 281A may start the secondary fermentation step S800 after the primary fermentation step S700 is completed.

The controller 281A may control the refrigerant cycle device 13 and the heater 14 such that the temperature measured by the temperature sensor 16 becomes a secondary fermentation target temperature, during the secondary fermentation step S800.

During the secondary fermentation step S800, since the internal pressure of the fermentation container 12 is high, loud noise may occur when the gas discharge valve 73 is opened. In order to solve this, the controller 281A may maintain the closed state of the gas discharge valve 73 during the secondary fermentation step S800 and perform control to open/close the pressure release valve 76 provided with the noise reducing device 77.

The controller 281A may periodically open and close the pressure release valve 76 after the secondary fermentation step S800 starts, and store the pressure detected by the gas pressure sensor 72 in a storage unit (not shown) while the pressure release valve 76 is closed. When a pressure change periodically detected by the gas pressure sensor 72 exceeds second fermentation set pressure, the controller 281A may determine that secondary fermentation is completed and complete the secondary fermentation step S800.

The beverage making step may include an aging step S900.

More specifically, when both the primary fermentation step S700 and the secondary fermentation step S800 are completed, the aging step S900 may be performed.

The controller 281A may wait for an aging time during the aging step and control the refrigerant cycle device 13 and the heater 14 such that the temperature of beverage during the aging time is maintained between an upper limit of a set aging temperature and a lower limit of the set aging temperature.

Since the beverage maker is mainly used indoors, the external temperature of the beverage maker is generally between the upper limit of the set aging temperature and the lower limit of the set aging temperature or higher than the upper limit of the set aging temperature. In this case, the controller 281A may turn off the compressor of the refrigerant cycle device 13 when the temperature detected by the temperature sensor 16 is equal to or less than the lower limit of the set aging temperature and turn on the compressor when the temperature detected by the temperature sensor 16 is equal to or greater than the upper limit of the set aging temperature.

Exceptionally, when the external temperature of the beverage maker is less than the lower limit of the set aging temperature, the controller 281A may turn on the heater 14 if the temperature detected by the temperature sensor 16 is less than the lower limit, and may turn off the heater 14 if the temperature detected by the temperature sensor 16 is equal to or greater than the upper limit of the set aging temperature.

The beverage maker may completely make the beverage when the aging time has elapsed.

However, in some cases, the aging step S900 may be omitted, and, when the secondary fermentation step S800 is completed, the beverage may be completely made.

The controller 281A may display completion of making of the beverage through the display 282.

In addition, the controller 281A may control the compressor 34 such that the temperature of the fermentation tank 112 is maintained between the upper limit and lower limit of a preset drinking temperature. The controller 281A may turn on the compressor of the refrigerant cycle device 13 when the temperature detected by the temperature sensor 16 is equal to or greater than the upper limit of the drinking temperature and turn off the compressor when the temperature detected by the temperature sensor 16 is less than the lower limit of the drinking temperature. Therefore, the beverage maker may always provide a cool beverage to the user.

The controller 281A may maintain the temperature of the fermentation tank 112 between the upper limit and lower limit of the preset drinking temperature until the beverage dispensing step S1000 is completed.

The beverage maker according to an embodiment of the present disclosure may further include a beverage dispensing step S1000 of dispensing the beverage after the beverage is completely made.

According to an example of the beverage dispensing step S1000, the beverage dispensing step S1000 may include a beverage dispensing process and a dispenser cleaning process.

During the beverage dispensing step S1000, the user may dispense the beverage by manipulating the dispenser 62.

After the beverage is completely made, when the user opens the dispenser 62, the controller 281A may open the main valve 40 and the beverage dispensing channel 64.

When the main valve 40 and the beverage dispensing channel 64 are opened, the beverage in the fermentation container 12 may flow from the fermentation container 12 to the second main channel 42 by the pressure of air between the outer surface of the fermentation container 12 and the inner wall of the fermentation tank 112 and flow from the second main channel 42 to the beverage dispensing channel 61, thereby being dispensed through the dispenser 62.

When the user dispenses some of the beverage through the dispenser 62 and then closes the dispenser 62, the controller 281A may close the main valve 40 and the beverage dispensing channel 64. Therefore, one beverage dispensing process may be completed.

Thereafter, the controller 281A may turn on the air pump 82, open the air supply valve 159, and maintain the closed state of the exhaust valve 156.

When the air pump 82 is turned on, air injected into the air injection channel 81 may flow from the first main channel 41 to the air supply channel 154, thereby being supplied between the outer surface of the fermentation container 12 and the inner wall of the fermentation tank 112. Air between the outer surface of the fermentation container 12 and the inner wall of the fermentation tank 112 may pressurize the fermentation container 12 with pressure that allows the beverage of the fermentation container 12 to rise to the second main channel 42. This is to enable pressure between the outer surface of the fermentation container 12 and the inner wall of the fermentation tank 112 to be sufficiently high, such that the beverage of the fermentation container 12 is smoothly and rapidly dispensed when the beverage is dispensed later.

The user may dispense the beverage at least once through the dispenser 62. That is, the beverage dispensing process may be performed at least once, and the controller 281A may determine whether the beverage is completely dispensed using information such as a time when the dispenser 62 is opened, a time when the air pump 152 is driven and a time when the main valve 40 is turned on after the beverage is completely made.

The controller 281A may close the air supply valve 159 when the beverage is completely dispensed. In addition, the controller 281A may open the exhaust valve 156 during a completion set time, when the beverage is completely dispensed and the dispenser 62 is in the closed state.

When control is performed to open the exhaust valve 156, air between the outer surface of the fermentation container 12 and the inner wall of the fermentation tank 112 may be discharged to the exhaust valve 156 through the air supply channel 154 and the exhaust channel 157, and the pressure of the space between the outer surface of the fermentation container 12 and the inner wall of the fermentation tank 112 may be equal to atmospheric pressure.

The controller 281A may close the exhaust valve 156, when the completion set time has elapsed after the exhaust valve 156 is turned on.

When the cleaning step S1100 is not performed after the beverage is completely dispensed or when the cleaning step S1100 does not include a main channel washing process which will be described later, the controller 281A may display a pack removal message prompting to remove the fermentation container 12 on the display 282. The user may open the fermentation lid 107 to take the fermentation container 12 out of the fermentation tank module 111.

When the fermentation lid 107 is opened, if the internal pressure of the fermentation tank 112 is equal to or greater than the atmospheric pressure by set pressure or more, the fermentation container 12 may bounce to the upper portion of the fermentation tank 112 by the pressure difference.

In contrast, before the user opens the fermentation lid 107, if some of air between the fermentation container 12 and the fermentation tank 112 is discharged through the exhaust valve 156, the fermentation container 12 does not bounce upward and is kept inside the fermentation tank 112, when the fermentation lid 107 is opened.

That is, the user may safely and cleanly take the used fermentation container 12 out of the fermentation tank 112.

Meanwhile, the dispenser cleaning process may be performed after at least one beverage dispensing process.

If there is a significant time interval from a last beverage dispensing process to a next beverage dispensing process, the inside of the dispenser 62 may be contaminated by the beverage remaining in the dispenser 62.

Accordingly, when the user attempts to dispense the beverage after a dispenser cleaning set time has elapsed from the last beverage dispensing process, the controller 281A may perform the dispenser cleaning process.

More specifically, the controller 281A may start a timer (not shown) when each beverage dispensing process is completed and reset the timer when a next beverage dispensing process starts. The controller 281A may perform the dispenser cleaning process when the timer exceeds the dispenser cleaning set time and the dispenser 62 is opened.

In addition, the controller 281A may perform the dispenser cleaning process by receiving a dispenser cleaning command from the input unit or the mobile terminal.

When the dispenser cleaning process starts, the controller 281A may display a cleaning notification on the display 282. The cleaning notification may include content instructing the user not to bring a cup to the dispenser 62.

An example of the dispenser cleaning process may include a water washing process and an air washing process.

During the water washing process, the controller 281A may turn on the water supply pump 52. In addition, the controller 281A may open the sub valve 92 and the beverage dispensing channel 64 and maintain the closed state of the ingredient supply valve 310 and the bypass valve 35.

When the water supply pump 52 is turned on, water sucked from the water tank 51 to the water supply pump 52 may flow from the water supply channel 55B to the sub channel 91, pass through the sub valve 92 to flow to the beverage dispensing channel 61, and pass through the beverage dispensing channel 64, thereby being dispensed through the dispenser 62. While water is dispensed through the dispenser 62, cleaning may be performed by taking residue and foreign materials out of the dispenser 62.

Water and foreign materials taken out through the dispenser 62 may be dropped to the beverage container 101 (see FIG. 2).

When the quantity of accumulated water of the flow meter 56 reaches a water washing set quantity after the water washing process starts, the controller 281A may complete the water washing process. In this case, the water washing set quantity may be less than a cleaning set quantity in the cleaning steps S100 and S1100.

The controller 281A may turn off the water supply pump when the water washing process is completed. In addition, the controller 281A may start the air washing process when the water washing process is completed.

The controller 281A may turn on the air pump 82 when the air washing process starts.

When the air pump 82 is turned on, air injected from the air pump 82 to the first main channel 41 through the air injection channel 81 may pass through the water supply heater 53 to flow to the sub channel 91, pass through the sub valve 92 to flow to the beverage dispensing channel 61, and pass through the beverage dispensing channel 64, thereby being discharged through the dispenser 62. In the process of discharging air through the dispenser 62, cleaning may be performed by dispensing air along with residual water remaining in the dispenser 62. Therefore, it is possible to minimize influence of residual water on the taste of the beverage in the beverage dispensing process.

The controller 281A may complete the air washing process when an air washing set time has elapsed after the air washing process. When the air washing process is completed, the controller 281A may turn off the air pump 82 and close the sub valve 92. Therefore, the dispenser cleaning process may be completed.

The controller 281A may start the beverage dispensing process again when the dispenser cleaning process is completed.

Meanwhile, when the entire beverage of the fermentation container 12 is dispensed and the controller 281A determines that the beverage is completely dispensed, the controller 281A may further perform the beverage making step and the cleaning step S1100 after dispensing the beverage.

The beverage making step and the cleaning step S1100 after dispensing the beverage may include at least one of a first cleaning process or a second cleaning process, when the cleaning step S1100 includes the first cleaning process and the second cleaning process, the order of the cleaning processes may not be limited.

The first cleaning process is equal or similar to the cleaning step S100 before the beverage making step and thus a repeated description thereof will be omitted. Hereinafter, the second cleaning process will be described.

The second cleaning process may be performed in a state in which the beverage is completely dispensed and the empty fermentation container 12 is installed, or may be performed after the user removes the empty fermentation container 12 and installs a separate cleaning pack in the fermentation tank 112. Hereinafter, for convenience of description, for example, the case where the separate cleaning pack is accommodated in the fermentation tank 112 will be described.

The controller 281A may display a container replacement notification on the display 282, when the beverage of the fermentation container 12 is completely dispensed. The user may insert the separate cleaning pack into the fermentation tank 112 after opening the fermentation lid and removing the empty fermentation container 12 from the fermentation tank 112. Thereafter, the fermentation lid 107 may be closed.

Thereafter, the controller 281A may start the second cleaning process.

When the second cleaning process starts, the controller 281A may turn on the water supply pump 52 and the water supply heater 53 and close the beverage dispensing channel 64. In addition, the controller 281A may open the ingredient supply valve 310, the bypass valve 35 and the main valve 40.

When the second cleaning process starts, the controller 281A may open the gas discharge valve 73 and the exhaust valve 156. In addition, the controller 281A may open the sub valve 92.

When the water supply pump 52 is turned on, water of the water tank 51 may flow to the water supply heater 53, thereby being heated by the water supply heater 53.

Water (that is, hot water) heated by the water supply heater 53 may divisionally flow to the sub channel 91 and the first main channel 41.

Water flowing to the sub channel 91 may pass through the sub valve 92 to flow to the beverage dispensing channel 61. Water flowing to the beverage dispensing channel 61 may flow to the second main channel 42 and pass through the main valve 40 to flow into the cleaning pack accommodated in the fermentation tank 112.

In addition, water flowing to the first main channel 41 may divisionally flow to the ingredient supplier 3 and the bypass channel 43.

Water flowing to the ingredient supplier 3 may sequentially pass through the ingredient supply valve 310, the initial capsule mounting portion 31, the intermediate capsule mounting portion 32 and the final capsule mounting portion 33 to flow to the second main channel 43 and may pass through the main valve 40 to flow into the cleaning pack accommodated in the fermentation tank 112.

Water flowing to the bypass channel 43 may pass through the bypass valve 35 to flow to the second main channel 43 and pass through the main valve 40 to flow into the cleaning pack accommodated in the fermentation tank 112.

During the control, the main channels 41 and 42, the bypass channel 43, the sub channel 91, the valves installed in each channel and the main channel connecting portion 115 may be sterilized and washed. In addition, the capsule mounting portions 31, 32 and 33 and the connecting channels 311 and 312 may be sterilized and washed.

The controller 281A may perform the above-described cleaning during a second cleaning set time and complete the second cleaning process after the second cleaning set time.

The controller 281A may turn off the water supply pump 52 and the water supply heater 53 after the second cleaning set time has elapsed, and close the main valve 40, the bypass valve 35, the ingredient supply valve 310, the sub valve 92, the gas discharge valve 73 and the exhaust valve 156.

Meanwhile, after the cleaning step S1100 is completed, the user may open the fermentation lid 107 and take out and process the cleaning pack containing water used for washing in the fermentation tank 112.

Meanwhile, when the temperature of refrigerant flowing in the evaporator 134 surrounding a portion of the outside of the fermentation tank 112 is too cold, movement of the yeast accommodated in the fermentation container 12 becomes dull or the yeast adjacent to the evaporator 134 may not act by cold shock.

In order to solve this problem, the temperature of the refrigerant in the evaporator 134 may be controlled. However, in this case, although the temperature of the refrigerant may be controlled, it may be difficult to uniformly control the temperature of the refrigerant affected by various variables such as an external temperature and compressor efficiency. Since decreasing the temperature of the refrigerant is advantageous to control the internal temperature of the fermentation tank 112, there is a need for a trade-off between the temperature control of the refrigerant and prevention of the cold shock of the yeast.

Therefore, in order to prevent partial cold shock of the yeast in the fermentation tank 112, it is possible to prevent the refrigerant of the evaporator 134 from being brought into direct contact with the fermentation tank 112 or the fermentation container 12 inside the fermentation tank 112.

Specifically, the inner surface of the fermentation tank 112 and the outer surface of the fermentation container 12 are likely to be brought into contact with each other during fermentation. For example, the fermentation container 12 may expand by fermentation of the beverage in the fermentation container 12, and there is no an insulation space or material between the evaporator and the fermentation container 12, thereby decreasing mobility of the yeast in the fermentation container 12 by the evaporator.

Therefore, a separate component capable of preventing cold shock of the yeast by the evaporator 134 may be provided on the outer circumferential surface of the fermentation tank 112.

An embodiment in which the separate component capable of preventing cold shock of the yeast is provided will now be described.

Figure 5:
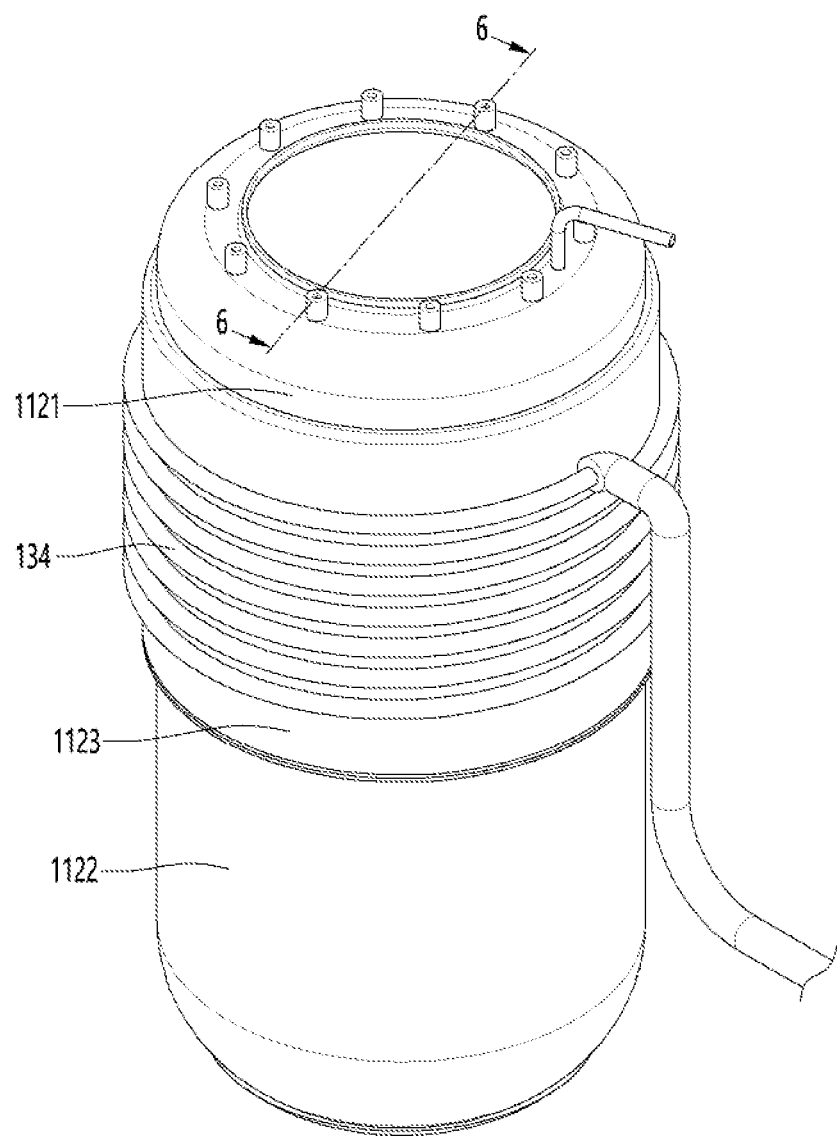
FIG. 5 is a perspective view of a beverage maker fermentation tank module according to an embodiment of the present disclosure.
Figure 6:
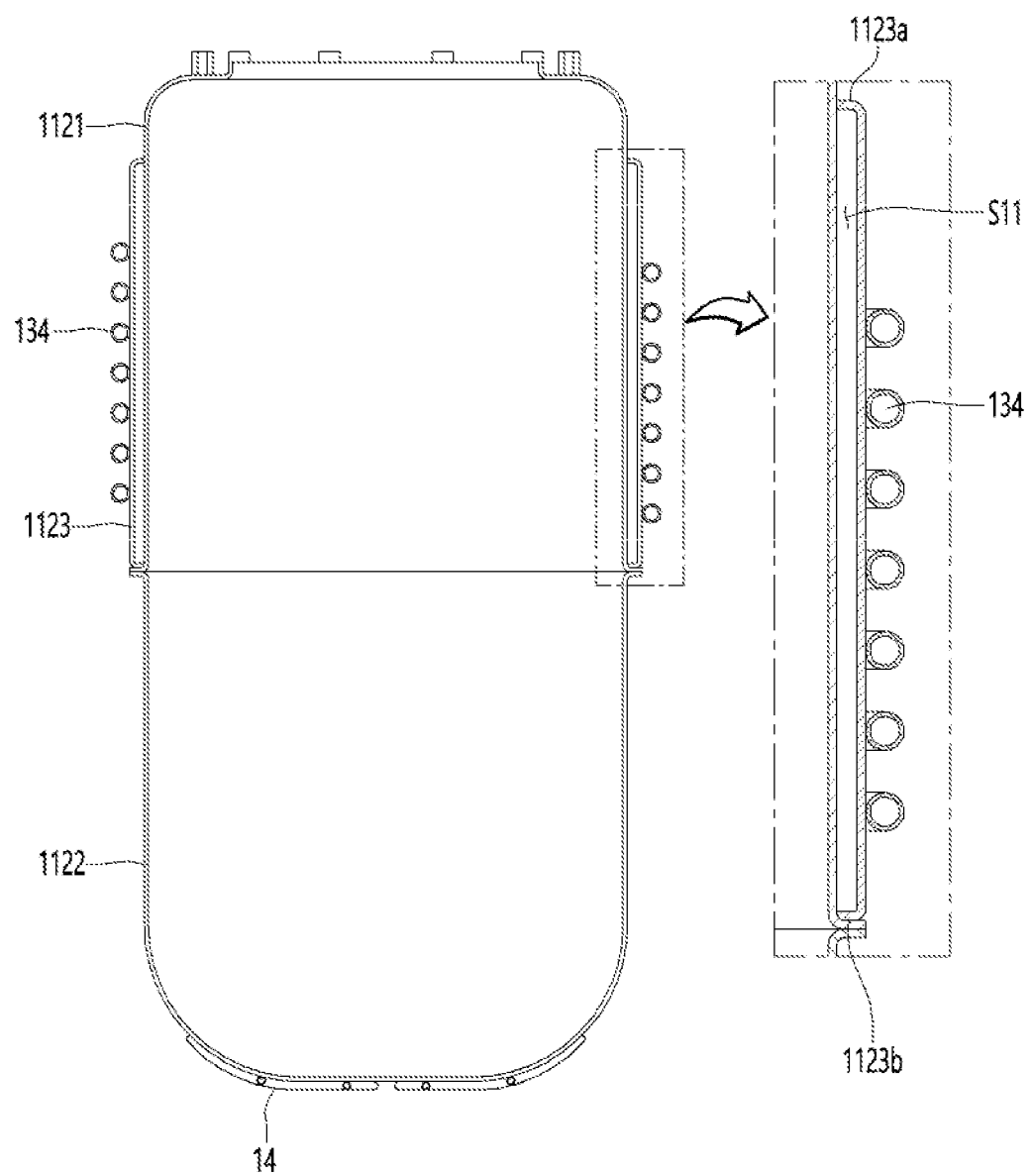
FIG. 6 is a cross-sectional view of a fermentation tank module take along line 6-6 of FIG. 5.

FIG. 5 is a perspective view of a beverage maker fermentation tank module according to an embodiment of the present disclosure, and FIG. 6 is a cross-sectional view of a fermentation tank module take along line 6-6 of FIG. 5.

According to FIGS. 5 and 6, a separate air layer structure may be provided on the outer circumferential surface of the fermentation tank 112.

The fermentation tank 112 may be, for example, formed by combining a plurality of chambers. Specifically, the fermentation tank 112 may include a first chamber 1121 and a second chamber 1122 coupled to the first chamber 1121.

Since the content cooled by the evaporator 134 drops and the content heated by a lower heater rises, the evaporator 134 may be located on the first chamber 1121 disposed at the upper side in order to uniformly mix the content in the fermentation container 12.

Specifically, the evaporator 134 may be located along the outer circumferential surface of the first chamber 1121.

The separate air layer structure may be provided between the evaporator 134 and the outer circumferential surface of the first chamber 1121.

Specifically, the fermentation tank module 111 may include a plate 1123 surrounding at least a portion of the outer circumferential surface of the fermentation tank 112.

For example, the plate 1123 may be disposed between the outer circumferential surface of the fermentation tank 112 and the evaporator 134, and may have a cylindrical shape in which upper and lower surfaces surrounding the outer circumferential surface of the fermentation tank 112 are open.

The plate 1123 may have upper and lower ends bent toward the outer surface of the fermentation tank 112.

For example, a first end 112a may be bent from an upper portion of the plate 1123 toward the outer circumferential surface of the fermentation tank 112, and a second end 1123b may be bent from a lower portion of the plate 1123 toward the outer circumferential surface of the fermentation tank 112.

That is, the first and second ends 1123a and 1123b may be bent and extended to the center of the cylinder formed by the plate 1123.

In addition, the plate 1123 may be coupled to the outer surface of the fermentation tank 112 by the first and second ends 1123a and 1123b, and an air layer S11 may be formed by the plate 1123 and the outer surface of the fermentation tank 112.

Specifically, the air layer S11 may surround a portion of the outer surface of the fermentation tank 112, and the plate 1123 and the fermentation tank 112 may be brought into contact with each other by only the first and second ends 1123a and 1123b.

That is, the diameter of a circle formed by the plate 1123 may be greater than the diameter of a circle formed by the outer circumferential surface of the fermentation tank 112, and the diameter of the circle formed by the first and second ends 1123a and 1123b may correspond to the diameter of the circle formed by the outer circumferential surface of the fermentation tank 112.

Therefore, temperature exchange by the evaporator 134 may mainly occur at the first and second ends 1123a and 1123b, thereby preventing mobility of the yeast from decreasing by the temperature of the evaporator 134.

In addition, the thickness of the air layer S11, that is, a length from the outer circumferential surface of the fermentation tank 112 to the plate 1123 may be greater than the thickness of the fermentation tank 112 or the thickness of the plate 1123.

In addition, the plate 1123 may be located to surround the outer circumferential surface of the first chamber 1121.

Meanwhile, as another embodiment for preventing mobility of the yeast from decreasing by the very low temperature of the evaporator 134, an insulation member 1124 may be located between the evaporator 134 and the fermentation tank 112.

Figure 7:
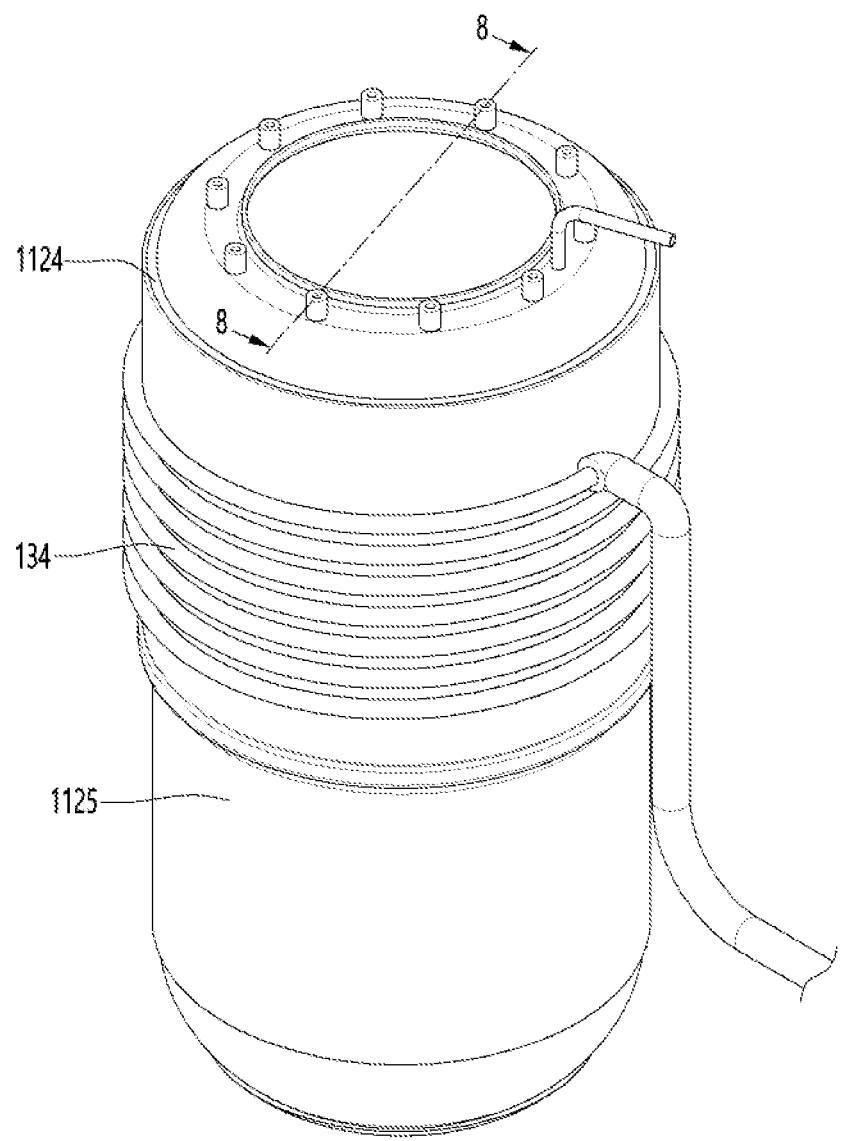
FIG. 7 is a perspective view of a beverage maker fermentation tank module according to another embodiment of the present disclosure.
Figure 8:
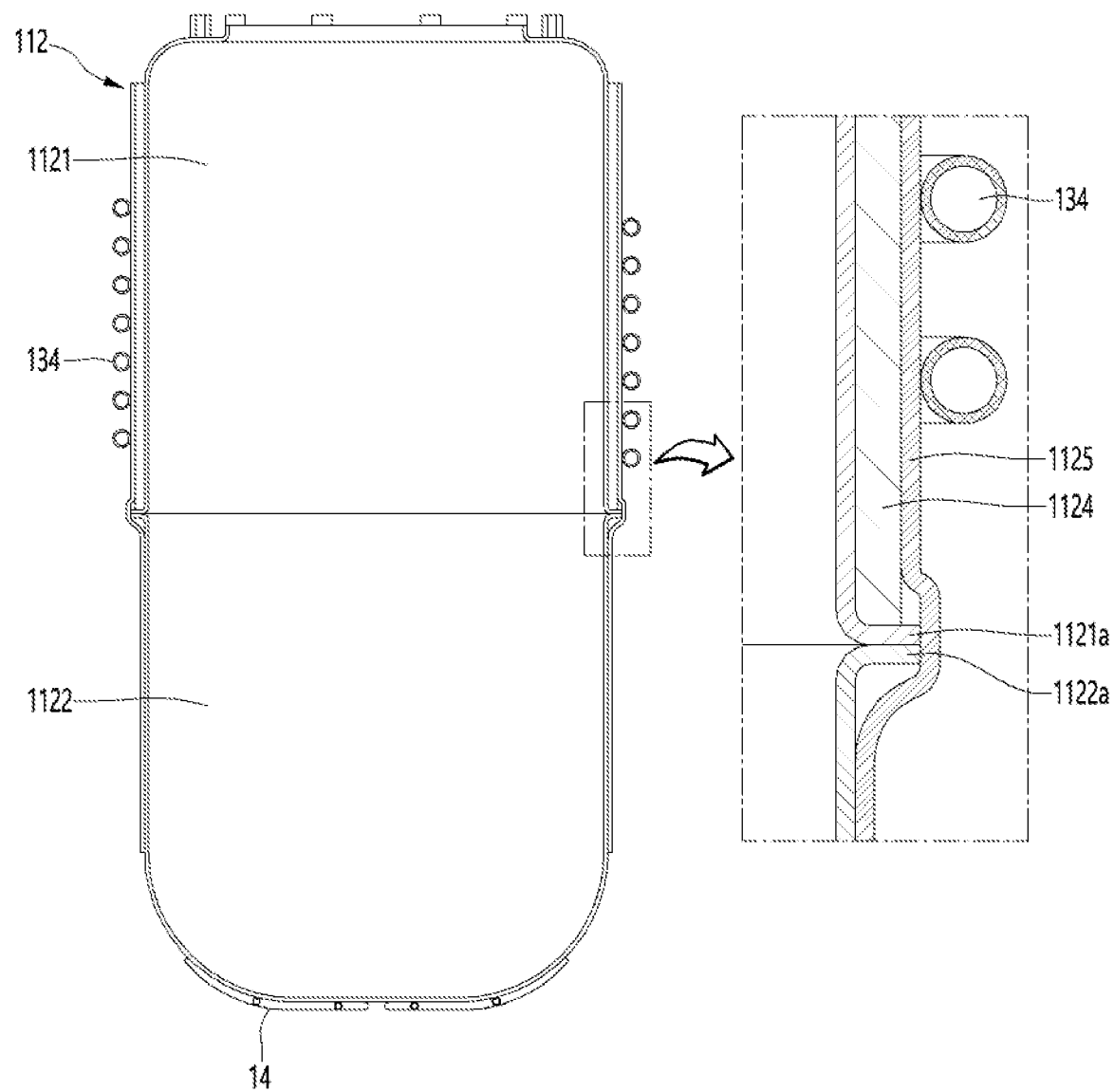
FIG. 8 is a cross-sectional view of a fermentation tank module taken along line 8-8 of FIG. 7.

FIG. 7 is a perspective view of a beverage maker fermentation tank module according to another embodiment of the present disclosure, and FIG. 8 is a cross-sectional view of a fermentation tank module taken along line 8-8 of FIG. 7.

Referring to FIGS. 7 and 8, an insulation 1124 surrounding the outer circumferential surface of the fermentation tank 112 may be provided, and the evaporator 134 may be located along the outer circumferential surface of the insulation 1124.

In addition, a separate heat conduction sheet 1125 may be further included between the insulation member 1124 and the evaporator 134.

Specifically, the heat conduction sheet 1125 may be attached to the entire outer circumferential surface of the fermentation tank 112 to cover the outer circumferential surfaces of the first chamber 1121 and the second chamber 1122.

In addition, the heat conduction sheet 1125 may accelerate heat conduction from the first chamber 1121 where the evaporator 134 is located to the second chamber 1122, thereby reducing a heat condition variation between the first chamber 1121, with which the evaporator 134 is in contact, and the second chamber 1122, with which the evaporator 134 is not in contact.

For example, the heat conduction sheet 1125 may be a graphite sheet. The graphite sheet may include graphite and a protective film coated on the outside of the graphite. The graphite sheet has more excellent heat conductivity and thermal diffusivity in a plane direction than a metal material such as silver, copper or aluminum.

Meanwhile, ends of the first chamber 1121 and the second chamber 1122 may be bent and extended outward and may be in contact with each other.

That is, the lower end 1121a of the first chamber 1121 and the upper end 1122a of the second chamber 1122 may be in contact with each other, and the insulation member 1124 may be in contact with the upper end of the lower end 1121a of the first chamber 1121.

In addition, a coupling portion in which the lower end 1121a of the first chamber 1121 and the upper end 1122a of the second chamber 1122 are in contact with each other may be covered by the heat conduction sheet 1125.

That is, the first chamber 1121, the insulation member 1124 and the heat conduction sheet 1125 may be sequentially stacked in the first chamber 1121, and the second chamber 1122 and the heat conduction sheet 1125 may be sequentially stacked in the second chamber 1122.

In addition, the thickness of the insulation member 1124, that is, a length of the insulation member 1124 in the outward direction of the fermentation tank 112, may be greater than the thickness of the heat conduction sheet 1125.

In addition, a length of the insulation member 1124 in the upper-and-lower direction may be less than that of the heat conduction sheet 1124 in the upper-and-lower direction.

Specifically, the insulation member 1124 may be disposed in a portion with which the evaporator 134 is in contact, thereby decreasing a rate of temperature exchange with the evaporator 134. Through the heat conduction sheet 1124 surrounding the entire fermentation tank 112, it is possible to a temperature variation between the first chamber 1121 in which the evaporator 134 is disposed and the second chamber 1122 in which the evaporator 134 is not disposed.

Meanwhile, the heater 14 may be disposed below the fermentation tank 112. In this case, the heater 14 and the heat conduction sheet 1124 may be spaced apart from each other not to be in contact with each other.

This is to prevent fire from occurring in the heat conduction sheet 1124 by the heater 14.

The above-disclosed subject matter is to be considered illustrative, and not restrictive, and the appended claims are intended to cover all such modifications, enhancements, and other embodiments, which fall within the scope of the present disclosure.

Thus, the embodiment of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A beverage maker comprising:
   a fermentation tank defining an internal space;
   a temperature controller that is configured to control a temperature of the fermentation tank and that includes an evaporator and a heater; and
   an insulation portion surrounding a portion of an outer circumferential surface of the fermentation tank,
   wherein the fermentation tank comprises (i) a first chamber in which the evaporator is disposed and (ii) a second chamber that is configured to contact the heater and that is coupled to the first chamber,
   wherein the insulation portion is located between the first chamber and the evaporator, and
   wherein the insulation portion comprises a plate defining an air layer along the outer circumferential surface of the fermentation tank.

2. The beverage maker of claim 1, wherein the plate is disposed on the outer circumferential surface of the fermentation tank.

3. The beverage maker of claim 2,
   wherein the plate comprises both ends bent and extended toward the outer circumferential surface of the fermentation tank, and
   wherein the outer circumferential surface of the fermentation tank and the both ends are in contact with each other.

4. The beverage maker of claim 1,
   wherein the second chamber is coupled to a lower end of the first chamber, and
   wherein the heater is disposed on a lower end of the second chamber.

5. The beverage maker of claim 1, wherein the insulation portion comprises an insulation member disposed along an outer circumferential surface of the first chamber.

6. The beverage maker of claim 1,
   wherein the evaporator comprises an evaporation tube defining a refrigerant flow path, through which refrigerant flows, and
   wherein the evaporation tube is spirally wound on the outer surface of the fermentation tank.

7. The beverage maker of claim 1, further comprising a fermentation case surrounding an outside of the fermentation tank with a predetermined gap,
   wherein an insulation is accommodated between the fermentation case and the fermentation tank.

8. A beverage maker comprising:
   a fermentation tank defining an internal space;
   a temperature controller that is configured to control a temperature of the fermentation tank and that includes an evaporator and a heater; and
   an insulation portion surrounding a portion of an outer circumferential surface of the fermentation tank,
   wherein the fermentation tank comprises (i) a first chamber in which the evaporator is disposed and (ii) a second chamber that is configured to contact the heater and that is coupled to the first chamber,
   wherein the insulation portion is located between the first chamber and the evaporator,
   wherein the insulation portion comprises an insulation member disposed along an outer circumferential surface of the first chamber, and
   wherein the insulation portion further comprises a heat conduction sheet surrounding the insulation member and the fermentation tank outside the insulation member.

9. The beverage maker of claim 8, wherein the heat conduction sheet is a graphite sheet.

10. The beverage maker of claim 8, wherein the heat conduction sheet surrounds outer circumferential surfaces of the first chamber and the second chamber.

11. The beverage maker of claim 8, wherein a thickness of the insulation member in an outward direction of the fermentation tank is greater than that of the heat conduction sheet in the outward direction of the fermentation tank.

12. The beverage maker of claim 8, wherein the heat conduction sheet and the heater are spaced apart from each other.

13. The beverage maker of claim 8, further comprising a coupling portion in which a lower end of the first chamber and an upper end of the second chamber are in contact with each other,
   wherein the heat conduction sheet surrounds the coupling portion.

14. The beverage maker of claim 8,
   wherein a lower end of the first chamber is bent and extended outward, and
   wherein the insulation member is in contact with the lower end of the first chamber.

15. The beverage maker of claim 8, wherein a length of the heat conduction sheet in an upper-and-lower direction is greater than that of the insulation member in the upper-and-lower direction.

* * * * *